United States Patent
Shinoda

(10) Patent No.: US 11,890,820 B2
(45) Date of Patent: Feb. 6, 2024

(54) METHOD FOR MANUFACTURING THREE-DIMENSIONAL STRUCTURE, AND THREE-DIMENSIONAL STRUCTURE

(71) Applicant: HOSIDEN CORPORATION, Yao (JP)

(72) Inventor: Koji Shinoda, Yao (JP)

(73) Assignee: HOSIDEN CORPORATION, Yao (JP)

( * ) Notice: Subject to any disclaimer, the term of this patent is extended or adjusted under 35 U.S.C. 154(b) by 56 days.

(21) Appl. No.: 17/541,330

(22) Filed: Dec. 3, 2021

(65) Prior Publication Data

US 2022/0194022 A1   Jun. 23, 2022

(30) Foreign Application Priority Data

Dec. 18, 2020   (JP) .................................. 2020-210253

(51) Int. Cl.
| | |
|---|---|
| B29C 65/64 | (2006.01) |
| B29C 45/00 | (2006.01) |
| B29C 45/14 | (2006.01) |
| B60R 13/00 | (2006.01) |
| B60R 13/04 | (2006.01) |
| B29L 31/30 | (2006.01) |

(52) U.S. Cl.
CPC ........ B29C 65/645 (2013.01); B29C 45/0003 (2013.01); B29C 45/14311 (2013.01); B60R 13/005 (2013.01); B60R 13/04 (2013.01); B29K 2995/0005 (2013.01); B29L 2031/3005 (2013.01)

(58) Field of Classification Search
None
See application file for complete search history.

(56) References Cited

U.S. PATENT DOCUMENTS

| | | |
|---|---|---|
| 2004/0265512 A1 | 12/2004 | Aengenheyster et al. |
| 2015/0283786 A1* | 10/2015 | Massault .................... B60J 1/02 362/546 |
| 2018/0242403 A1 | 8/2018 | Weissenberger et al. |

FOREIGN PATENT DOCUMENTS

| | | | |
|---|---|---|---|
| DE | 102014002438 A1 | | 8/2015 |
| JP | 2018-066706 A | | 4/2018 |
| KR | 10 2014 0039443 A | * | 4/2014 |
| KR | 20140039443 A | | 4/2014 |
| WO | 2020148385 A1 | | 7/2020 |
| WO | WO-2020 148385 A1 | * | 7/2020 ............... H01Q 1/02 |

OTHER PUBLICATIONS

Extended European search report, issued by the European Patent Office dated May 13, 2022, for European Patent Application No. 21213465.4.

* cited by examiner

*Primary Examiner* — Mohammad M Ameen
(74) *Attorney, Agent, or Firm* — Kilyk & Bowersox, P.L.L.C.

(57) ABSTRACT

A method for manufacturing a three-dimensional structure including: preparing a first structure including a fixing face; fixing a plastic layer to the fixing face of the first structure; preparing a conductive wire; and operating an ultrasonic head to apply ultrasonic waves to the conductive wire and to press the conductive wire against the plastic layer, and thereby partly embedding the conductive wire into the plastic layer.

6 Claims, 13 Drawing Sheets

METHOD FOR MANUFACTURING THREE-DIMENSIONAL STRUCTURE, AND THREE-DIMENSIONAL STRUCTURE

CROSS-REFERENCE TO RELATED APPLICATIONS

The present application claims priority under 35 U.S.C. § 119 of Japanese Patent Application No. 2020-210253 filed on Dec. 18, 2020, the disclosure of which is expressly incorporated by reference herein in its entirety.

BACKGROUND OF THE INVENTION

Technical Field

The invention relates to methods for manufacturing a three-dimensional structure, and three-dimensional structures.

Background Art

A conventional three-dimensional structure is disclosed in Japanese Unexamined Patent Application Publication No. 2018-066706. This three-dimensional structure is an ornamental vehicle part to be attached forwardly of a millimeter wave radar device in a transmission direction of millimeter waves. The structure includes an ornamental body transparent to millimeter waves and a heater in the form of a sheet.

The ornamental main body includes a transparent part, a substrate, and an ornamental layer. The transparent part is made of a plastic material transparent to millimeter waves. The substrate is also made of a plastic material. The substrate includes a front substrate molded on the transparent part and located rearwardly of the transparent part in the transmission direction, and a rear substrate molded on the front substrate and located rearwardly of the front substrate in the transmission direction. The front and rear substrates sandwich a main part of the heater from the front and rear in the transmission direction, and are joined together in this state. The ornamental layer is formed between the transparent part and the substrate.

The heater includes the main part, which includes a linear heating element, a pair of electrodes, and a pair of plastic sheets. The electrodes are connected to opposite end portions of the heating element. The plastic sheets cover and sandwich the heating element and the electrodes from the front and rear in the transmission direction. Between the main part of the heater and a recess of the front substrate is a gap filled with a filling portion forming part of the rear substrate.

SUMMARY OF INVENTION

The conventional three-dimensional structure described above is manufactured in the follow manner. First, the transparent part is prepared, and the front substrate is insert-molded on the transparent part so as to be located behind the transparent part. Thereafter, the main part of the heater is bonded to a rear face of the front substrate. At this time, the gap is left between the recess of the front substrate and the main part of the heater. Thereafter, the rear substrate is insert-molded on the front substrate so as to be located behind the front substrate and cover the main part of the heater. At this time, a portion (the filling portion) of the rear substrate is filled into the gap. Thus, the conventional three-dimensional structure is manufactured.

During insert-molding the rear substrate, a molten plastic material to form the rear substrate press the main part of the heater, which may cause undesirable displacement of the main part of the heater.

The invention provides a method for manufacturing a three-dimensional structure, and a three-dimensional structure, with reduced possibility of undesirable displacement of a conductive wire of the three-dimensional structure.

A method for manufacturing a three-dimensional structure of an aspect of the invention includes preparing a first structure including a fixing face; fixing a plastic layer to the fixing face of the first structure; preparing a conductive wire; and operating an ultrasonic head to apply ultrasonic waves to the conductive wire and to press the conductive wire against the plastic layer, and thereby partly embedding the conductive wire into the plastic layer.

In the method of this aspect, the conductive wire is partly embedded in the plastic layer, resulting in a reduced possibility of undesirable displacement of the conductive wire.

The fixing of the plastic layer may include placing the first structure into a cavity of a first molding die, injecting molten plastic onto the fixing face of the first structure in the cavity of the first molding die, and solidifying the molten plastic to mold the plastic layer on the fixing face of the first structure.

The molding of the plastic layer may include placing at least a part of an embedded portion of a terminal into the cavity of the first molding die and inserting an external connection portion of the terminal into an accommodation hole communicating with the cavity of the first molding die, inserting at least the part of the embedded portion of the terminal into the molten plastic injected into the cavity of the first molding die, and solidifying the molten plastic to insert-mold at least the part of the embedded portion of the terminal into the plastic layer. In this case, the method may further include electrically connecting the terminal to the conductive wire.

The fixing of the plastic layer may include bonding or engaging the plastic layer to the fixing face of the first structure. Where the terminal is provided, at least the first part of the embedded portion of the terminal may be insert-molded in the plastic layer.

The plastic layer may include a first face in contact with the fixing face of the first structure and a second face opposite to the first face.

The molding of the plastic layer may include placing the part of the embedded portion of the terminal into the cavity of the first molding die and inserting a remaining part of the embedded portion of the terminal and the external connection portion of the terminal into the accommodation hole of the first molding die, inserting the part of the embedded portion of the terminal into the molten plastic injected into the cavity of the first molding die, and solidifying the molten plastic to insert-mold the part of the embedded portion of the terminal into the plastic layer. In this case, the embedding of the conductive wire may include operating the ultrasonic head to apply ultrasonic waves onto the conductive wire and to press the conductive wire against the second face of the plastic layer, and thereby partly embedding the conductive wire into the second face of the plastic layer, and operating the ultrasonic head to apply ultrasonic waves onto the conductive wire and to press the conductive wire against the remaining part of the embedded portion of the terminal, and thereby bringing the conductive wire partly into contact with the remaining part of the embedded portion of the terminal.

A binder layer may be provided on the embedded portion of the terminal. In this case, the insert-molding of the embedded portion of the terminal may include insert-molding the embedded portion of the terminal into the plastic layer such that an exposed face of the binder layer is substantially flush with the second face of the plastic layer. The embedding of the conductive wire may include operating the ultrasonic head to apply ultrasonic waves onto the conductive wire and to press the conductive wire against the second face of the plastic layer, and thereby partly embedding the conductive wire into the second face of the plastic layer, and operating the ultrasonic head to apply ultrasonic waves onto the conductive wire and bringing the conductive wire partly into contact with the exposed face of the binder layer. The electrical connection of the terminal to the conductive wire may include melting the binder layer and partly exposing the embedded portion of the terminal from the binder layer to connect the conductive wire to the embedded portion of the terminal by heat swaging, welding, or soldering.

The conductive wire may at least include a wire body.

The conductive wire may further include a fusion layer covering the wire body. In this case, the electrical connection of the terminal to the conductive wire may include partly melting the fusion layer and partly exposing the wire body from the fusion layer to connect the conductive wire to the embedded portion of the terminal by heat swaging, welding, or soldering. The conductive wire may further include an insulating layer between the wire body and the fusion layer. In this case, the electrical connection of the terminal to the conductive wire may include partly melting not only the fusion layer but also the insulating layer and partly exposing the wire body from the insulating layer and the fusion layer to connect the conductive wire to the embedded portion of the terminal by heat swaging, welding, or soldering.

The fixing face of the first structure may be provided with at least one protrusion and at least one recess. In this case, the second face of the plastic layer may be a smooth face. The embedding of the conductive wire may include operating the ultrasonic head to apply ultrasonic waves onto the conductive wire and to press the conductive wire against the second face of the plastic layer, and thereby partly embedding the conductive wire into the second face of the plastic layer.

The method of any of the above aspects may further include fixing a second structure to the plastic layer after embedding the conductive wire and covering with the second structure the conductive wire partly protruding from the plastic layer.

The method of any of the above aspects may further include placing the first structure, the plastic layer, the conductive wire, and the second structure into a cavity of a second molding die; injecting molten plastic between the plastic layer and the second structure in the cavity of the second molding die; inserting a portion of the conductive wire that protrudes from the plastic layer into the molten plastic injected into the cavity of the second molding die; solidifying the molten plastic in the cavity of the second molding die to mold an infill layer between the plastic layer and the second structure; and embedding the portion of the conductive wire protruding from the plastic layer in the infill layer.

A three-dimensional structure of an aspect of the invention includes a first structure including a fixing face; a plastic layer fixed to the fixing face of the first structure; and a conductive wire partly embedded in the plastic layer.

The plastic layer may be molded on the fixing face of the first structure. Instead, the plastic layer may be bonded or engaged onto the fixing face of the first structure, for example.

The three-dimensional structure of any of the above aspects may further include a terminal electrically connected to the conductive wire. The terminal may include an embedded portion and an external connection portion. At least a part of the embedded portion may be insert-molded in the plastic layer, and the external connection portion may be disposed outside the plastic layer.

The plastic layer may include a first face in contact with the fixing face of the first structure and a second face opposite to the first face.

A binder layer may be provided on the embedded portion of the terminal. In this case, the embedded portion of the terminal may be insert-molded in the plastic layer such that an exposed face of the binder layer is substantially flush with the second face of the plastic layer. The conductive wire may be not only bonded to the binder layer but also connected to the embedded portion of the terminal.

The conductive wire may at least include a wire body.

The conductive wire may further include a fusion layer covering the wire body. In this case, the wire body may be partly exposed from the fusion layer and connected to the embedded portion of the terminal. The conductive wire may further include an insulating layer interposed between the wire body and the fusion layer. In this case, the wire body may be partly exposed from the insulating layer and the fusion layer and connected to the embedded portion of the terminal.

The fixing face of the first structure may be provided with at least one protrusion and at least one recess. In this case, the second face of the plastic layer may be a smooth surface. The conductive wire may be partly embedded in the second face of the plastic layer.

The three-dimensional structure of any of the above aspects may further include a second structure. The second structure may be fixed to the plastic layer and cover the conductive wire partly protruding from the plastic layer.

The three-dimensional structure of any of the above aspects may further include an infill layer filled between the plastic layer and the second structure. The conductive wire partly protruding from the plastic layer may be embedded in the infill layer.

The three-dimensional structure may be a vehicle component. In this case, the first structure may be an ornamental part and/or a cover of the vehicle component.

The three-dimensional structure may be disposed forwardly of a millimeter wave radar device in a transmission direction of millimeter waves.

The conductive wire may be configured to be energized and thereby generate heat. Alternatively, the conductive wire may be used as a communication antenna, a coil, or a conductive line.

Figure 1A:
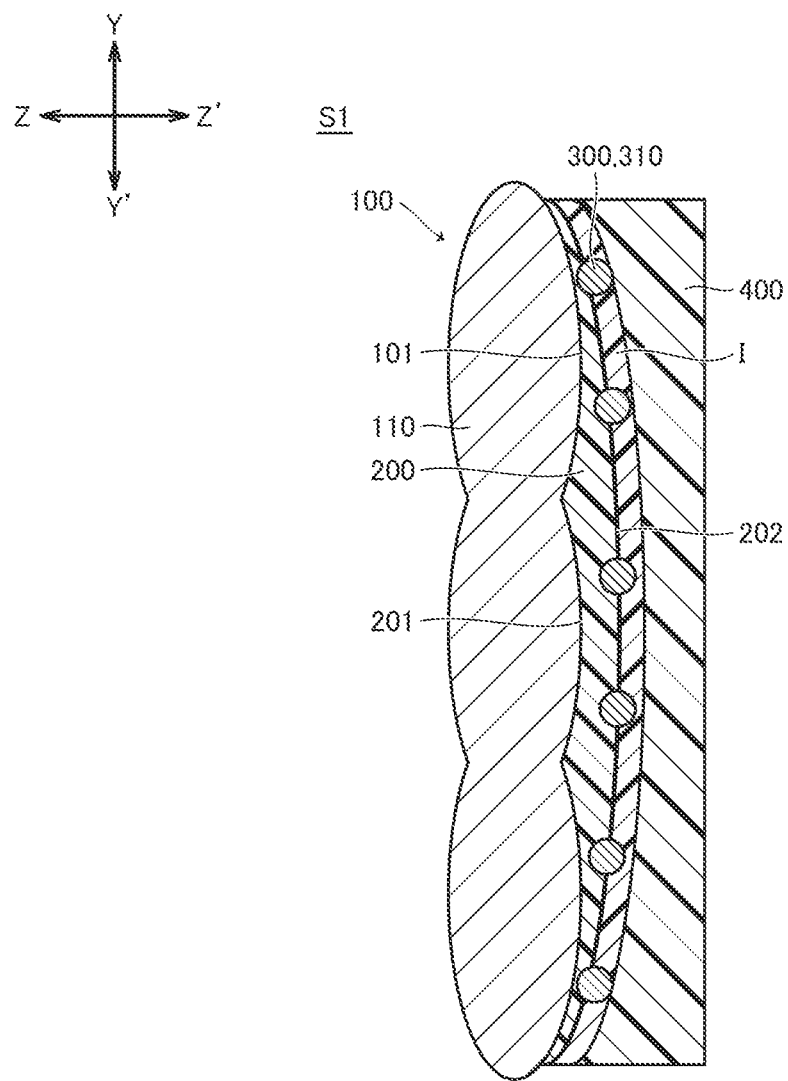
FIG. 1A is a schematic cross-sectional view of a three-dimensional structure according to a first embodiment of the invention.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the three-dimensional structures and their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

Hereinafter described are a plurality of embodiments of the invention, including first, second, and third embodiments and their variants. It should be noted that constituents of the embodiments and their variants to be described can be combined in any possible manner. It should also be noted that the materials, the shapes, the dimensions, the numbers, the arrangements, etc. that constitute each constituent of the embodiments and their variants to be described are presented by way of example only and can be modified in any manner as long as the same functions can be fulfilled.

First Embodiment

Figure 1B:
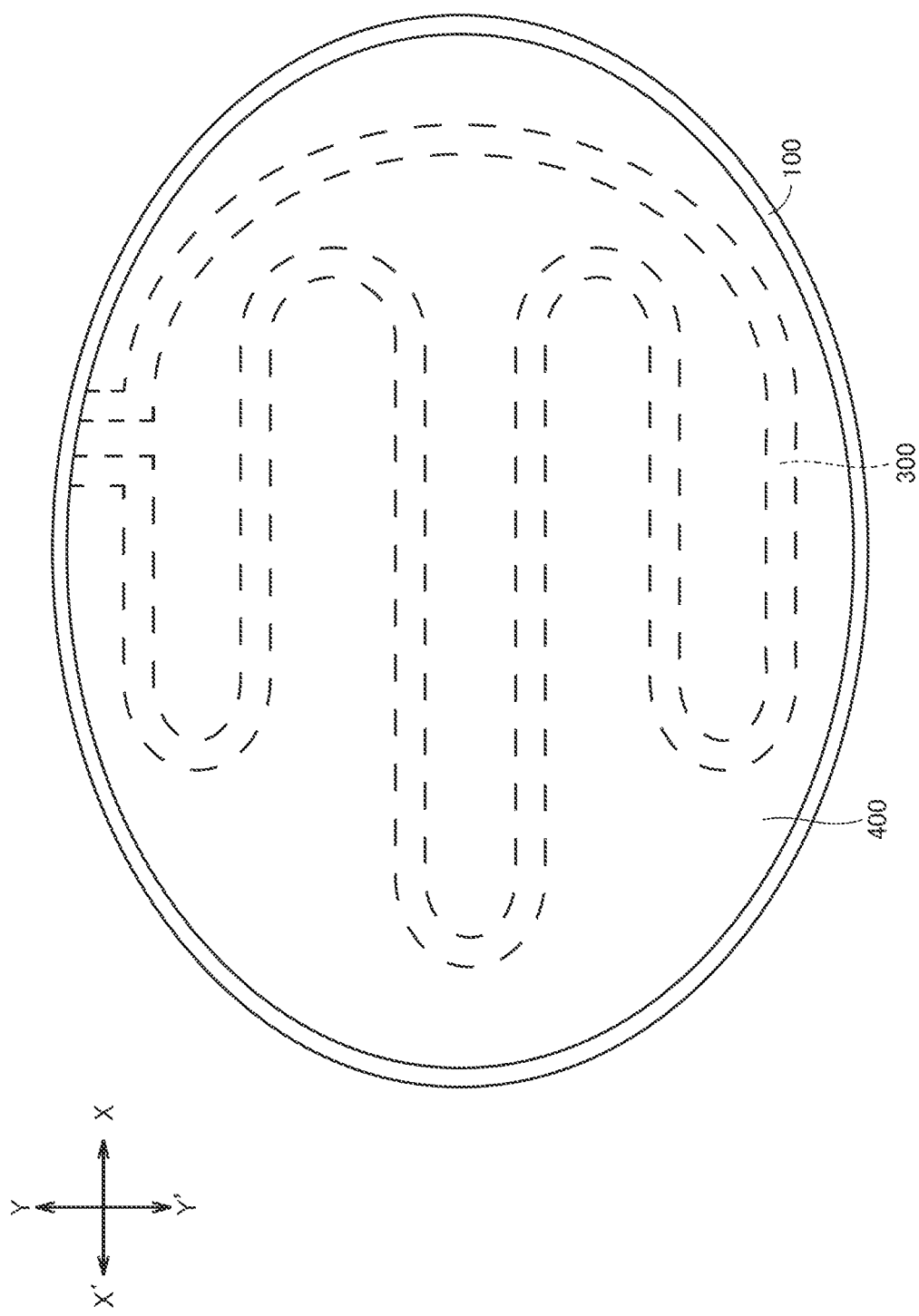
FIG. 1B is a schematic rear view of the three-dimensional structure according to the first embodiment.
Figure 1C:
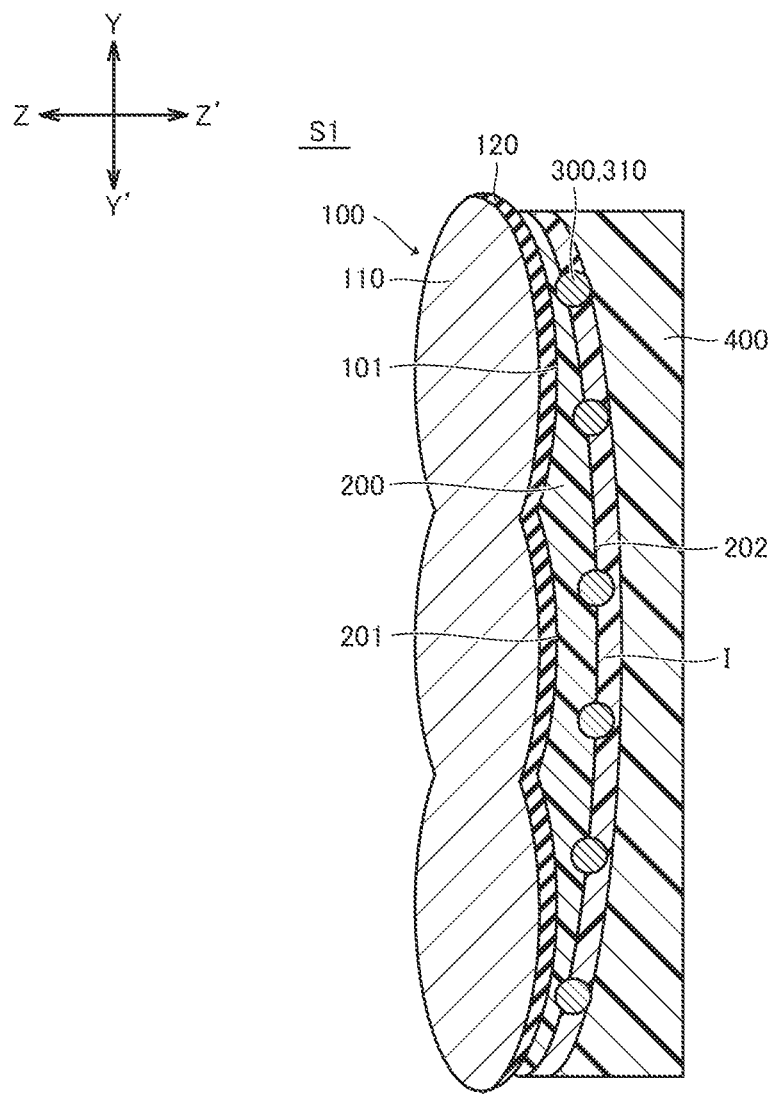
FIG. 1C is a schematic cross-sectional view of a first variant of the three-dimensional structure of the first embodiment.

Hereinafter described is a three-dimensional structure S1 according to a plurality of embodiments of the invention, including the first embodiment and variants thereof, with reference to FIGS. 1A to 1C. FIGS. 1A and 1B illustrate the three-dimensional structure S1 of first embodiment, and FIG. 1C illustrates a first variant of the three-dimensional structure S1 of the first embodiment. FIGS. 1A and 1C indicate a Z-Z' direction, which is a thickness direction of the three-dimensional structure S1. FIG. 1B indicates an X-X' direction, which is a lengthwise direction of the three-dimensional structure S1. FIGS. 1A to 1C indicate a Y-Y' direction, which is a widthwise direction of the three-dimensional structure S1.

The three-dimensional structure S1 includes a first structure 100. The first structure 100 may be any structure having a dimension in the Z-Z' direction, a dimension in the X-X' direction, and a dimension in the Y-Y' direction. For example, the first structure may be an ornamental part, such as an emblem, of a vehicle (e.g., an automobile, a railway vehicle, a motorcycle, or a bicycle), a ship, an aircraft, or the like; a cover of a camera or a light of a vehicle, a ship, an aircraft, or the like, a cover a camera or a light of a vending machine or a security device; a cover of a measuring device, such as a millimeter wave sensor or a light detection and ranging (LiDAR) sensor; a cover of a bumper of a vehicle, a ship, an aircraft, or the like; or a cover of an electronic component unit. The dimension in the X-X' direction and the dimension in the Y-Y' direction of the first structure 100 may be different from, or substantially the same as, each other. The dimension in the Z-Z' direction of the first structure 100 may be smaller than the dimension in the X-X' direction and the dimension in the Y-Y' direction of the first structure 100, but is not limited thereto.

The first structure 100 includes a main body 110 (see FIGS. 1A to 1C). The main body 110 is made of a plastic (e.g., molded plastic, a plastic film, or the like), glass, ceramic, wood, or a combination thereof. The main body 110 includes a first face on the Z-direction side and a second face on the Z'-direction side. The first structure 100 may further include at least one functional layer 120 (see FIG. 1C). The or each functional layer 120 is an ornamental layer, a hard coat layer, or an optical adjustment layer. The at least one functional layer is formed on at least part of at least one of the first face and the second face of the main body 110. In other words, the at least one functional layer is formed on at least part of the first face and/or at least part of the second face of the main body 110.

The first structure 100 includes a fixing face 101. Where the at least one functional layer 120 is provided on the entire second face of the main body 110 (see FIG. 1C), the fixing face 101 is a face on the Z'-direction side of the at least one functional layer 120. Where the at least one functional layer 120 is provided on a part of the second face of the main body 110, the fixing face 101 is the second face of the main body 110 and a face on the Z'-direction side of the at least one functional layer 120. Where the at least one functional layer 120 is not provided on the second face of the main body 110 (see FIGS. 1A and 1B), the fixing face 101 is the second face of the main body 110. The fixing face 101 may or may not be provided with a protrusion or protrusions and a recess or recesses. The fixing face 101 may be a flat face, a convex curved face protruding to one side in the lengthwise direction or protruding in the Z' direction, or alternatively a concave curved face recessed to the other side in the lengthwise direction or recessed in the Z direction.

The three-dimensional structure S1 further includes a plastic layer 200. The plastic layer 200 is fixed to the fixing face 101 of the first structure 100. For example, the plastic layer 200 may be molded plastic molded on the fixing face 101 of the first structure 100, or molded plastic bonded to, and/or engaged with, the fixing face 101 of the first structure 100. The plastic layer 200 has a dimension in the Z-Z' direction, a dimension in the X-X' direction, and a dimension in the Y-Y' direction. The plastic layer 200 includes a first face 201 on the Z-direction side and a second face 202 on the Z'-direction side. The first face 201 is fixed to the fixing face 101 of the first structure 100. Where the plastic layer 200 is molded on the fixing face 101 of the first structure 100, the first face 201 has a shape corresponding to the fixing face 101 of the first structure 100. Where the plastic layer 200 is bonded to, and/or engaged with, the fixing face 101 of the first structure 100, the first face 201 may have a shape corresponding to the fixing face 101 of the first structure 100, or may have a different shape. Where the plastic layer 200 is engaged with the fixing face 101 of the first structure 100, one of the first face 201 of the plastic layer 200 and the fixing face 101 of the first structure 100 may be provided with an engagement projection, and the other may be provided with an engagement recess to fittingly receive the engagement projection. The second face 202 may be a smooth face. For example, the smooth face may be a flat face, a convex curved face protruding to the one side in the lengthwise direction or protruding in the Z' direction, or alternatively a concave curved face recessed to the other side in the lengthwise direction or recessed in the Z direction.

The three-dimensional structure S1 further includes a conductive wire 300. The conductive wire 300 includes at least a wire body 310. The conductive wire 300 may be a heater configured to generate heat when the wire body 310 is energized, or may be a communication antenna, a coil, a conductive line, or the like, but is not limited thereto. The wire body 310 is an elongated object having a cylindrical shape or a polygonal prism shape and made of an electrically conductive and flexible material. Where the three-dimensional structure S1 is to be disposed outdoors, the conductive wire 300 may function as a heater configured as described above so as to melt snow and ice adhering to the three-dimensional structure S1.

The conductive wire 300 may further include a fusion layer (see FIG. 5) covering the wire body 310. Where the wire body 310 has a cylindrical shape, the fusion layer has a tubular shape with a circular section and covers the outer periphery of the wire body 310. Where the wire body 310 has a polygonal prism shape, the fusion layer has a tubular shape with a polygonal section and covers the outer periphery of the wire body 310.

The conductive wire 300 may further include an insulating layer (see FIG. 5) interposed between the wire body 310 and the fusion layer. Where the wire body 310 has a cylindrical shape, the insulating layer has a tubular shape with a circular section and covers the outer periphery of the wire body 310, and the fusion layer has a tubular shape with a circular section and covers the wire body 310 by covering the outer periphery of the insulating layer. Where the wire body 310 has a polygonal prism shape, the insulating layer has a tubular shape with a polygonal section and covers the outer periphery of the wire body 310, and the fusion layer has a tubular shape with a polygonal section and covers the wire body 310 by covering the outer periphery of the insulating layer. Where the conductive wire 300 includes the wire body 310, the fusion layer, and the insulating layer, the conductive wire 300 may be, but is not required to be, a self-fusion wire.

The conductive wire 300 of any of the above aspects is partly embedded in the second face 202 of the plastic layer 200. For example, the conductive wire 300 may be partly embedded in the second face 202 of the plastic layer 200 and has a shape of a single continuous line (which will be hereinafter referred to as a linear shape), such as a meandering shape, a spiral shape, or the like. Alternatively, the conductive wire 300 may include a plurality of wire portions partly embedded in the second face 202 of the plastic layer 200 such as to have a lattice arrangement, a concentric arrangement, a striped arrangement, or the like and a coupling portion coupling between the wire portions. In any of these configurations, the conductive wire 300 includes a portion on the Z-direction side (hereinafter also referred to as an embedded portion of the conductive wire 300) embedded in the second face 202 of the plastic layer 200 and a portion on the Z'-direction side (hereinafter also referred to as a protruded portion of the conductive wire 300) protruded in the Z' direction from the second face 202 of the plastic layer 200.

The wire body 310 may include at least one connection portion. The at least one connection portion may be a plurality of connecting portions. The plurality of connection portions may include first and second connection portions. Where the conductive wire 300 has the linear shape described above and the wire body 310 includes the at least one connection portion, the at least one connection portion of the wire body 310 may be any part or parts of the wire body 310. Where the conductive wire 300 has the linear shape and the wire body 310 includes the first and second connection portions, the first and second connection portions may be first and second end portions of the wire body 310. Where the conductive wire 300 includes the plurality of wire portions and the coupling portion, and the wire body 310 includes the at least one connection portion, the at least one connection portion of the wire body 310 may be any part or parts of the plurality of wire portions or the coupling portion. Where the conductive wire 300 includes the plurality of wire portions and the coupling portion and the wire body 310 includes the first and second connection portions, the first and second connection portions of the wire body 310 may be any two parts of the wire portions or may be first and second end portions of the coupling portion.

The three-dimensional structure S1 may further include a second structure 400 and an infill layer I. The second structure 400 has a dimension in the Z-Z' direction, a dimension in the X-X' direction, and a dimension in the Y-Y' direction. The second structure 400 includes a first face in contact with the second face 202 of the plastic layer 200 and a second face on the opposite side (Z'-direction side). The second structure 400 is fixed to the second face 202 of the plastic layer 200 and covers the protruded portion of the conductive wire 300. For example, the second structure 400 may be made of a plastic (e.g., example, a molded plastic, a plastic film, or the like), glass, ceramic, wood, or a combination thereof, and bonded to, and/or engaged with, the second face 202 of the plastic layer 200. Where the second structure 400 is engaged with the second face 202 of the plastic layer 200, one of the second structure 400 and the plastic layer 200 may be provided with an engagement projection, and the other may be provided with an engagement recess to fittingly receive the engagement projection. There is a gap between the second face 202 of the plastic layer 200 and the second structure 400. The infill layer I is made of an injection-molded plastic filling the gap. The protruded portion of the conductive wire 300 is embedded in the infill layer I.

The infill layer I may be omitted. Where infill layer I is omitted, the second structure 400 may be a molded plastic molded on the second face 202 of the plastic layer 200, and the protruded portion of the conductive wire 300 may be embedded in the second structure 400; or alternatively the second structure 400 may be made of a plastic (for example, a molded plastic, a plastic film, or the like), glass, ceramic, wood, or a combination thereof, and bonded to, and/or engaged with, the second face 202 of the plastic layer 200. In latter case, there may be or may not be a gap between the second structure 400 and the plastic layer 200. The second structure 400 may also be omitted.

Where the second structure 400 is provided, the at least one connection portion of the conductive wire 300 may protrude from the second structure 400 to the Z'-direction side so as to be connectable to the outside, or may be exposed or protruded from the outer peripheral surface of the plastic layer 200 so as to be connectable to the outside (see FIG. 1B). Where neither the second structure 400 nor the infill layer I are provided, the at least one connection portion of the conductive wire 300 may have a portion on the Z'-direction side protruding from the plastic layer 200 so as to be connectable to the outside. In any of these cases, where the conductive wire 300 is a heater, the at least one connection portion of the conductive wire 300 is connectable to an energizing device; where the conductive wire 300 is an antenna, the at least one connection portion of the conductive wire 300 is connectable to a communication device, and where the conductive wire 300 is a coil or a conductive line, the at least one connection portion of the conductive wire 300 is connectable to an electronic device.

Figure 2A:
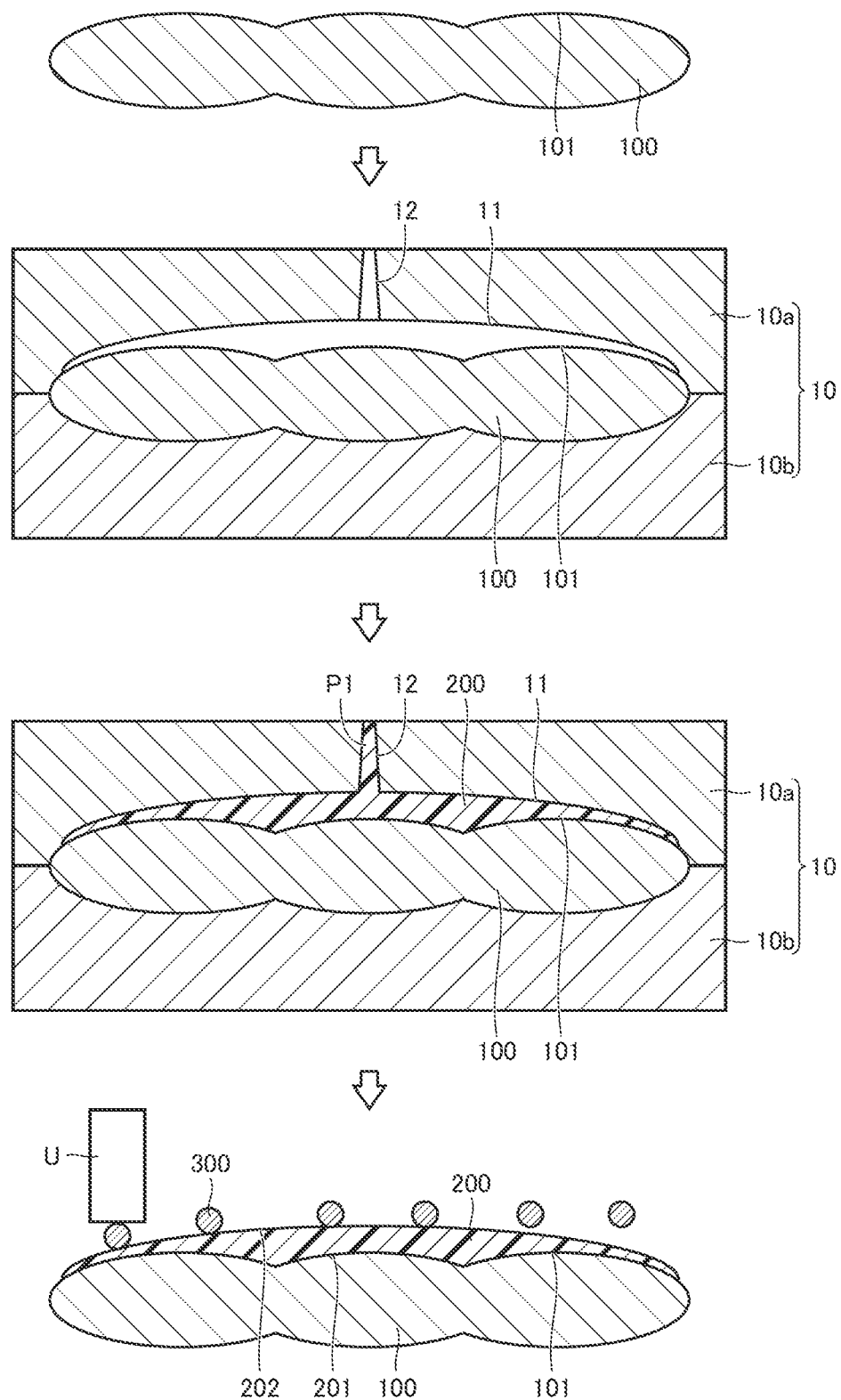
FIG. 2A includes views for explaining steps of a method for manufacturing the three-dimensional structure of the first embodiment. The steps include a step of preparing a first structure of the three-dimensional structure, a step of placing the first structure in a first molding die, a step of molding a plastic layer on the first structure, and a step of embedding a conductive wire in the plastic layer.
Figure 2B:
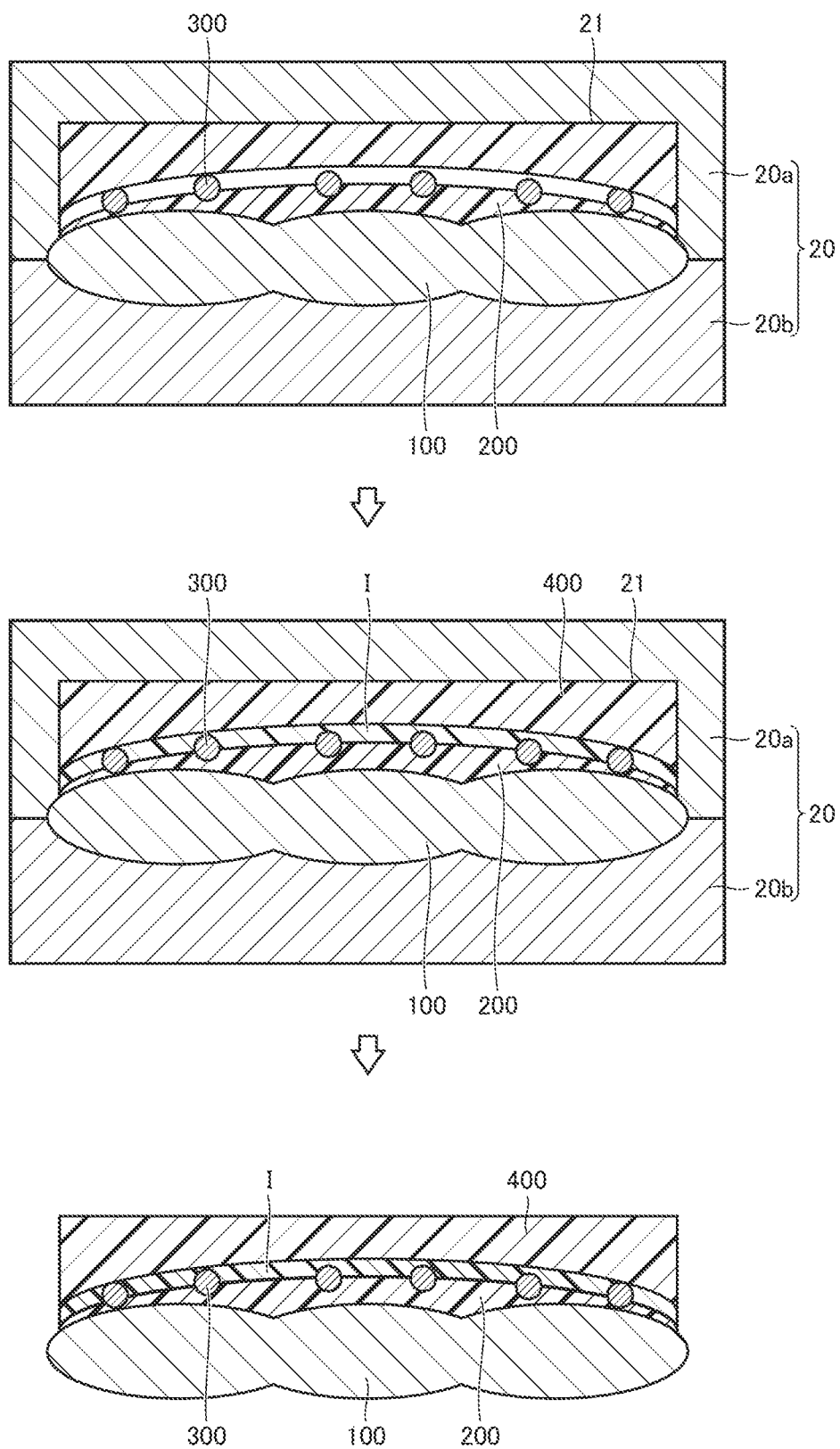
FIG. 2B includes views for explaining subsequent steps, following the steps illustrated in FIG. 2A, of the method for manufacturing the three-dimensional structure of the first embodiment. The subsequent steps include a step of placing the first structure, the intermediate layer, the conductive wire, and a second structure in a second molding die, a step of molding an infill layer between the plastic layer and the second structure, and a step of taking out the three-dimensional structure from the second molding die.

The three-dimensional structure S1 described above are manufactured with a method described below and as shown in FIGS. 2A and 2B. FIGS. 2A and 2B illustrate steps of a method for manufacturing the three-dimensional structure S1. The method for manufacturing the three-dimensional structure S1 uses a first molding die 10 having a cavity 11 conforming to the outer shapes of the first structure 100 and the plastic layer 200. The method also uses a second molding die 20 having a cavity 21 conforming to the outer shapes of the first structure 100, the plastic layer 200, and the second structure 400.

First, the first structure 100 of any of the above aspects is prepared (see the first view from the top in FIG. 2A). A first mold 10a and a second mold 10b of the first molding die 10 are opened, and the first structure 100 is placed on the second mold 10b. Thereafter, the first mold 10a and the second mold 10b are closed together. The first structure 100 is thus disposed into the cavity 11 of the first molding die 10 (see the second view from the top in FIG. 2A). Thereafter, molten plastic is injected through a sprue 12 of the first molding die 10 to fill a space on the fixing face 101 of the first structure 100 in the cavity 11 of the first molding die 10 (see the third view from the top in FIG. 2A). The molten plastic cools or otherwise solidifies, so that the plastic layer 200 is molded on the fixing face 101 of the first structure 100, and a first plastic portion P1 is molded inside the sprue 12 of the first molding die 10. The plastic layer 200 is thus fixed onto the fixing face 101 of the first structure 100. Thereafter, the first mold 10a and the second mold 10b are opened, the first structure 100 and the plastic layer 200 are taken out, and the first plastic portion P1 is removed.

Alternatively, instead of molding the plastic layer 200 as described above, but the plastic layer 200 molded in a molding die (not shown) is prepared. The first face 201 of the plastic layer 200 is bonding to, and/or engaging with, the fixing face 101 of the first structure 100 as described above and thereby fixed to the fixing face 101.

After fixing the plastic layer 200, the conductive wire 300 of any of the above aspects is prepared. An ultrasonic head U, which is configured to ultrasonically vibrate, of an ultrasonic generator is operated to apply ultrasonic waves to the conductive wire 300 and to press the conductive wire 300 against the plastic layer 200, and the conductive wire 300 is thereby embedded partly into the plastic layer 200. This step of embedding the conductive wire 300 may specifically be the following step (1) or (2), for example.

(1) Where the conductive wire 300 has the above-described linear shape, the step of embedding the conductive wire 300 may specifically be the following step (1-1), (1-2), or (1-3).

(1-1) While the conductive wire 300 is fed partly and sequentially, from the first end portion to the second end portion thereof, onto the second face 202 of the plastic layer 200, the ultrasonic head U of the ultrasonic generator is operated to apply ultrasonic waves sequentially to the part of the conductive wire 300 that has been fed onto the second face 202 of the plastic layer 200, and to sequentially press the part of the conductive wire 300 against the second face 202 of the plastic layer 200, so that a portion on the Z-direction side of the part of the conductive wire 300 is sequentially embedded into the second face 202 of the plastic layer 200 (see the fourth view from the top in FIG. 2A).

(1-2) The conductive wire 300 is arranged into the linear shape on the second face 202 of the plastic layer 200. Thereafter, the portion on the Z-direction side of a part of the conductive wire 300 is sequentially, from the first end portion to the second end portion thereof, embedded into the second face 202 of the plastic layer 200 (not shown) in a manner descried above for step (1-1).

(1-3) The conductive wire 300 is arranged into the linear shape on the second face 202 of the plastic layer 200. Thereafter, the ultrasonic head U of the ultrasonic generator is operated to apply ultrasonic waves onto the entire conductive wire 300 and to press the entire conductive wire 300 against the second face 202 of the plastic layer 200, so that a portion on the Z-direction side (embedded portion) of the conductive wire 300 is embedded into the second face 202 of the plastic layer 200 at a time (not shown).

(2) Where the conductive wire 300 includes the plurality of wire portions and the coupling portion, the step of embedding the conductive wire 300 may specifically be the following step (2-1), (2-2), or (2-3).

(2-1) While one of the wire portions of the conductive wire 300 is fed partly and sequentially, from the first end portion to the second end portion thereof, onto the second face 202 of the plastic layer 200, the ultrasonic head U of the ultrasonic generator is operated to apply ultrasonic waves sequentially to the part of the wire portion that has been fed onto the second face 202 of the plastic layer 200 and sequentially press the part of the one wire portion against the second face 202 of the plastic layer 200, so that a portion on the Z-direction side of the part of the one wire portion is sequentially embedded into the second face 202 of the plastic layer 200. This step is performed on all the wire portions. Before and after the step of embedding all the wire portions, while the coupling portion of the conductive wire 300 is fed partly and sequentially, from the first end portion to the second end portion thereof, onto the second face 202 of the plastic layer 200, the ultrasonic head U of the ultrasonic generator is operated to apply ultrasonic waves sequentially to the part of the coupling portion that has been fed onto the second face 202 of the plastic layer 200 and sequentially press the part of the coupling portion against the second face 202 of the plastic layer 200, so that a portion on the Z-direction side of the part of the coupling portion is sequentially embedded into the second face 202 of the plastic layer 200 (not shown).

(2-2) The plurality of wire portions and the coupling portion of the conductive wire 300 are arranged on the second face 202 of the plastic layer 200. Thereafter, a portion on the Z-direction side of the part of the one of conductive wire 300 of the plurality of wire portions is sequentially, from the first end portion to the second end portion thereof, embedded into the second face 202 of the plastic layer 200 in a manner descried above for step (2-1). This step is performed on all the wire portions. Before and after the step of embedding all the wire portions, as described above, the portion on the Z-direction side of the part of the coupling portion is embedded sequentially, from the first end portion to the second end portion thereof, into the second face 202 of the plastic layer 200 in a manner descried above for step (2-1) (not shown).

(2-3) The plurality of wire portions and the coupling portion of the conductive wire 300 are arranged on the second face 202 of the plastic layer 200. Thereafter, the ultrasonic head U of the ultrasonic generator is operated to apply ultrasonic waves onto the entire conductive wire 300 and to press the entire conductive wire 300 against the second face 202 of the plastic layer 200, so that a portion on the Z-direction side of the conductive wire 300 is embedded into the second face 202 of the plastic layer 200 at a time (not shown).

Thus the embedded portion on the Z-direction side of the conductive wire 300 is embedded into the second face 202 of the plastic layer 200, and the protruded portion on the Z'-direction side of the conductive wire 300 protrudes from the second face 202 of the plastic layer 200 in the Z' direction. Where the plastic layer 200 is fixed to the fixing face 101 of the first structure 100 by bonding and/or engagement, the embedded portion of the conductive wire 300 may be embedded into the second face 202 of the plastic layer 200, and then the plastic layer 200 may be fixed onto the fixing face 101 of the first structure 100 by bonding and/or engagement.

After the step of embedding the conductive wire 300, the second structure 400 is prepared. The second structure 400 is fixed to the second face 202 of the plastic layer 200 by bonding and/or engagement so as to cover the protruded portion of the conductive wire 300. At this time, a gap is generated between the first face of the second structure 400 and the second face 202 of the plastic layer 200.

Thereafter, a first mold 20a and a second mold 20b of the second molding die 20 are opened, and the first structure 100, the plastic layer 200, the conductive wire 300, and the second structure 400 are placed onto the second mold 20b. Thereafter, the first mold 20a and the second mold 20b are closed together. Thus the first structure 100, the plastic layer 200, the conductive wire 300, and the second structure 400 are disposed into the cavity 21 of the second molding die 20 (see the first view from the top in FIG. 2B). Thereafter, molten plastic is injected through a sprue (not shown) of the second molding die 20 to fill the gap between the first face of the second structure 400 and the second face 202 of the plastic layer 200 in the cavity 21 of the second molding die 20 (see the second view from the top in FIG. 2B). At this time, the protruded portion of the conductive wire 300 is inserted into the molten plastic. The molten plastic cools or otherwise solidifies, so that the infill layer I is formed between the second structure 400 and the second face 202 of the plastic layer 200, the protruded portion of the conductive wire 300 is embedded (insert-molded) into the infill layer I, and a second plastic portion is formed inside the sprue of the second molding die 20. Thereafter, the first mold 20a and the second mold 20b are opened, the first structure 100, the plastic layer 200, the conductive wire 300, the second structure 400, and the infill layer I are taken out (see the third view from the top in FIG. 2B), and the second plastic portion is removed.

Where the second structure 400 and the infill layer I are omitted, the step of fixing the second structure 400 to the second face 202 of the plastic layer 200 and the step of molding the infill layer I are omitted.

Where the infill layer I is omitted but the second structure 400 is provided, the first structure 100, the plastic layer 200, and the conductive wire 300 may be arranged in a cavity of a molding die (not shown), molten plastic is injected into the cavity and then solidified to mold the second structure 400 on the second face 202 of the plastic layer 200, with the protruded portion of the conductive wire 300 insert-molded in the second structure 400. Alternatively, the second structure 400 may be fixed to the second face 202 of the plastic layer 200 by bonding or engagement.

The three-dimensional structure S1 is manufactured in one of manners described above. In the three-dimensional structure S1 and the manufacturing method thereof, the conductive wire 300 is partly embedded in the plastic layer 200, resulting in a reduced possibility of undesirable displacement of the conductive wire 300. In particular, where the infill layer I is molded between the second structure 400 and the plastic layer 200, even if molten plastic to form the infill layer I is injected into the cavity 21 of the second molding die 20 and presses the conductive wire 300, it is possible to reduce the possibility of undesirable displacement of the conductive wire 300 because the conductive wire 300 is partly embedded in the second face 202 of the plastic layer 200. Also where the second structure 400 is molded on the plastic layer 200, as in the case where the infill layer I is molded, even if the molten plastic presses the conductive wire 300, it is possible to reduce the possibility of undesirable displacement of the conductive wire 300 because the conductive wire 300 is partly embedded in the second face 202 of the plastic layer 200.

Since the conductive wire 300 is partly embedded in the plastic layer 200, the first structure 100 can be constituted by any desirable material, and no distortion occur in the first structure 100 by embedding the conductive wire 300 into the first structure 100.

In addition, where the fixing face 101 of the first structure 100 is provided with the protrusion(s) and the recess(es), it would be difficult to embed the conductive wire 300 into the fixing face 101 using the ultrasonic head U of the ultrasonic generator. This is because where a part(s) of the conductive wire 300 is located in the recess(es) in the fixing face 101, the ultrasonic head U of the ultrasonic generator would come into contact with the periphery(s) of the recess(es), so that the ultrasonic head U of the ultrasonic generator would not be able to press the part of the conductive wire 300. in contrast, the three-dimensional structure S1 may be configured such that the second face 202 of the plastic layer 200 is a smooth surface. In this case, the ultrasonic head U of the ultrasonic generator can press the conductive wire 300, making it easy to embed the conductive wire 300 into the second face 202 of the plastic layer 200.

The conductive wire 300 is directly embedded in the plastic layer 200. Therefore, the three-dimensional structure S1 has a reduced number of components.

Second Embodiment

Figure 3A:
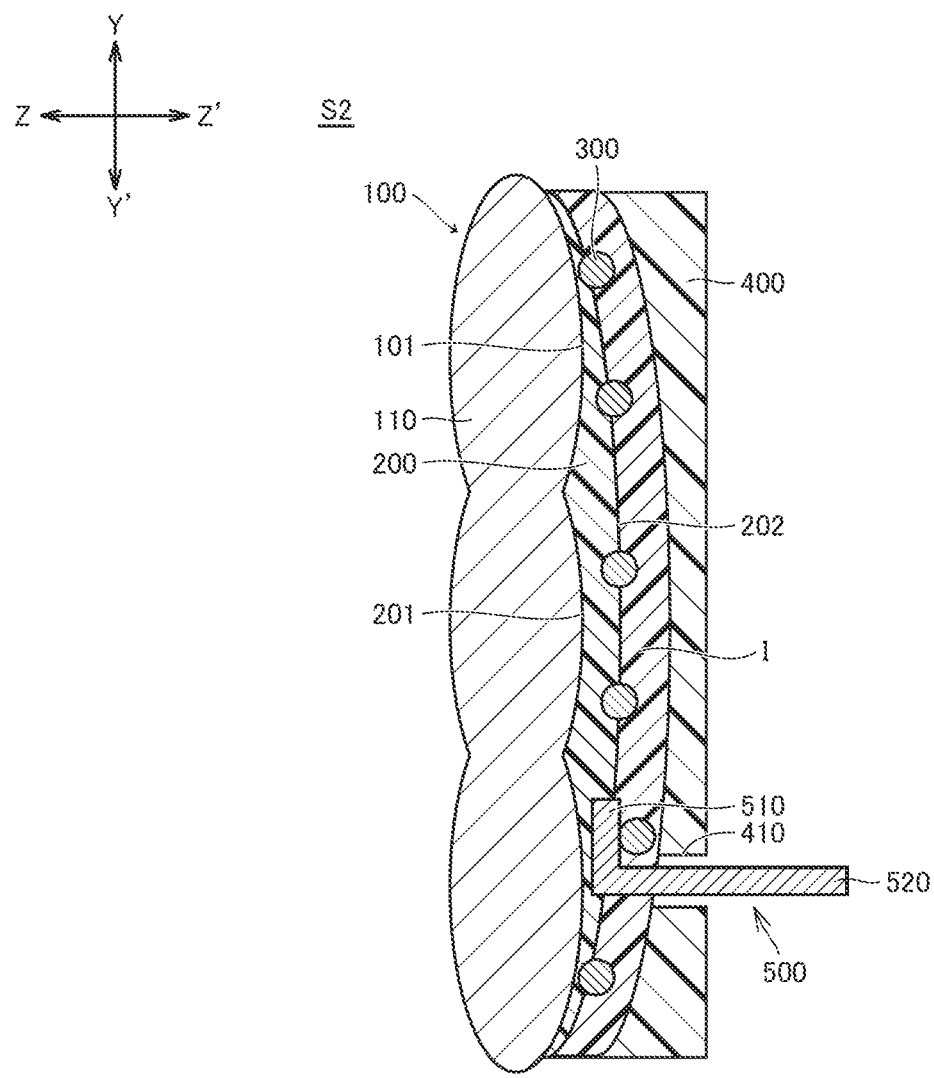
FIG. 3A is a schematic cross-sectional view of a three-dimensional structure according to a second embodiment of the invention.
Figure 3B:
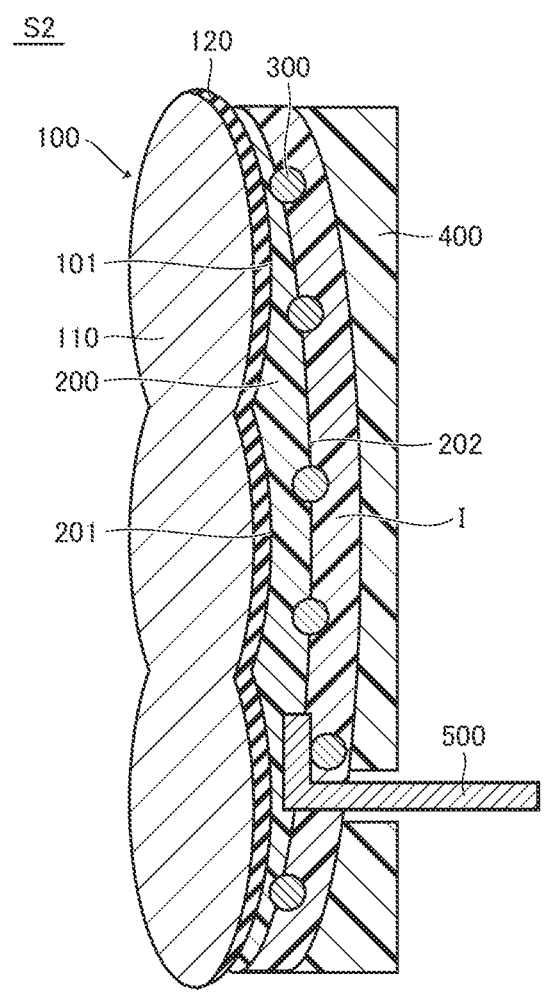
FIG. 3B is a schematic cross-sectional view of a three-dimensional structure according to a first variant of the second embodiment of the invention.
Figure 3C:
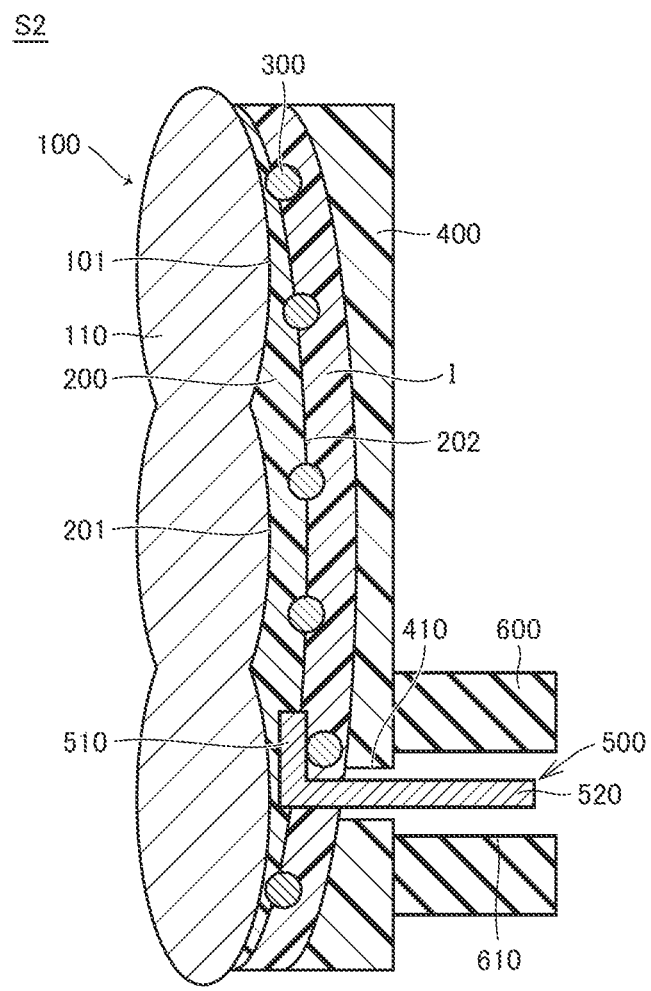
FIG. 3C is a schematic cross-sectional view of a three-dimensional structure according to a second variant of the second embodiment of the invention.

Hereinafter described is a three-dimensional structure S2 according to a plurality of embodiments of the invention, including a second embodiment and variants thereof, with reference to FIGS. 3A to 3C. FIG. 3A illustrates the three-dimensional structure S2 of the second embodiment, FIG. 3B illustrates a first variant of the three-dimensional structure S2 of the second embodiment, and FIG. 3C illustrates a second variant of the three-dimensional structure S2 of the second embodiment. FIG. 3A indicate a Z-Z' direction, which is a thickness direction of the three-dimensional structure S2. FIG. 3A indicates a Y-Y' direction, which is a widthwise direction of the three-dimensional structure S2. FIG. 1B can be referred to for the indication of the X-X' direction, which is a lengthwise direction of the three-dimensional structure S2.

The three-dimensional structure S2 has the same configuration as that of the three-dimensional structure S1, except that the three-dimensional structure S2 further includes at least one terminal 500. The three-dimensional structure S2 will now be described focusing on the differences from the three-dimensional structure S1 and omitting overlapping descriptions.

The at least one terminal 500 is made of an electrically conductive material. For example, the at least one terminal 500 may be made of a metal plate having higher strength than the wire body 310 of the conductive wire 300. The at least one terminal 500 may be a plurality of terminals 500. The plurality of terminals 500 may include first and second terminals 500, for example. For convenience of description, the at least one terminal 500 may be hereinafter referred to as "the or each terminal 500". Where the at least one terminal 500 is a single terminal 500, the terminal 500 of "the or each terminal 500" mean the single terminal 500, and where the at least one terminal 500 is a plurality of terminals, each terminal 500 of "the or each terminal 500" means each of the terminals 500.

The or each terminal 500 includes an embedded portion 510 and an external connection portion 520. The embedded portion 510 of the or each terminal 500 includes a part embedded in the second face 202 of the plastic layer 200 and the remaining part exposed or protruded from the second face 202 of the plastic layer 200. Hereinafter, the part of the embedding section 510 will be referred to as "the first part of the embedding section 510", and the remaining part of the embedding section 510 will be referred to as "the second part of the embedding section 510". The external connection portion 520 of the or each terminal 500 is located outside the plastic layer 200. For example, the external connection portion 520 of the or each terminal 500 may be located on the Z'-direction side relative to the plastic layer 200. The external connection portion 520 of the or each terminal 500 is externally connectable. Where the conductive wire 300 is a heater, the external connection portion 520 of the or each terminal 500 is connectable to an energizing device, where the conductive wire 300 is an antenna, the external connection portion 520 of the or each terminal 500 is connectable to a communication device, and where the conductive wire 300 is a coil or a conductive line, the external connection portion 520 of the or each terminal 500 is connectable to an electronic device. The external connection portion 520 of the or each terminal 500 includes a first portion on the Z-direction side and a second portion on the Z'-direction side, and the second portion includes a distal end portion of the external connection portion 520 of the or each terminal 500, which is a portion on the Z'-direction side of the second portion.

Where the second structure 400 and the infill layer I are provided, the second part of the embedded portion 510 of the or each terminal 500 and the first portion of the external connection portion 520 of the or each terminal 500 are embedded in the infill layer I. The second structure 400 is provided with a through hole 410. The second portion of the external connection portion 520 of the or each terminal 500 extends through the through hole 410 in the Z-Z' direction, and the distal end portion of the external connection portion 520 of the or each terminal 500 is located on the Z'-direction side relative to the through hole 410. Alternatively, the second portion of the external connection portion 520 of the or each terminal 500 is located in the through hole 410.

Where the infill layer I is not provided and the second structure 400 is fixed onto the second face 202 of the plastic layer 200, the external connection portion 520 of the or each terminal 500 extends through the through hole 410 of the second structure 400 in the Z-Z' direction or is disposed in the through hole 410 of the second structure 400.

The conductive wire 300 of the three-dimensional structure S2 includes the wire body 310, may additionally include the fusion layer (see FIG. 5), and may or may not include the insulating layer and the fusion layer. The at least one connection portion of the wire body 310 of the conductive wire 300 is electrically and mechanically connected to the embedded portion 510 of the at least one terminal 500. For example, the or each connection portion may be any portion of the wire body 310 that is in contact with, and may be electrically and mechanically connected to, the embedded portion 510 of the corresponding terminal 500. Where the conductive wire 300 includes the fusion layer but not the insulating layer, the or each connection portion is at least partly exposed from the fusion layer and electrically and mechanically connected to the embedded portion 510 of the corresponding terminal 500. Where the conductive wire 300 includes the insulating layer and the fusion layer, the or each connection portion is at least partly exposed from the insulating layer and the fusion layer, and is electrically and mechanically connected to the embedded portion 510 of the corresponding terminal 500. Where the at least one connection portion of the wire body 310 includes the first and second connection portions, the first and second connection portions may be any portions of the wire body 310 that are in contact with, and may be electrically and mechanically connected to, the embedded portions 510 of the first and second terminals 500, respectively.

The three-dimensional structure S2 may further include a body 600 (see FIG. 3C). The body 600 is made of an insulating material, such as a plastic material. The body 600 is fixed onto, or integrally provided on, the second face of the second structure 400. The body 600 is provided with a through hole 610. The through hole 610 communicates with the through hole 410 of the second structure 400, and the external connection portion 520 of the or each terminal 500 is disposed in the through hole 410 of the second structure 400 and the through hole 610 of the body 600. The external connection portion 520 of the or each terminal 500 and the body 600 constitute a connector. The connector is connectable to a mating connector of an external device not shown (e.g., the energizing device, the communication device, the electronic device, or the like mentioned above), with the body 600 connected to a body of the mating connector such that the external connection portion 520 of the or each terminal 500 is brought into contact with a terminal or a corresponding one of terminals of the mating connector. The body 600 may be omitted.

The first structure 100 of the three-dimensional structure S2 may include the at least one functional layer 120 (see FIG. 3B), or may not include the at least one functional layer 120.

Figure 4A:
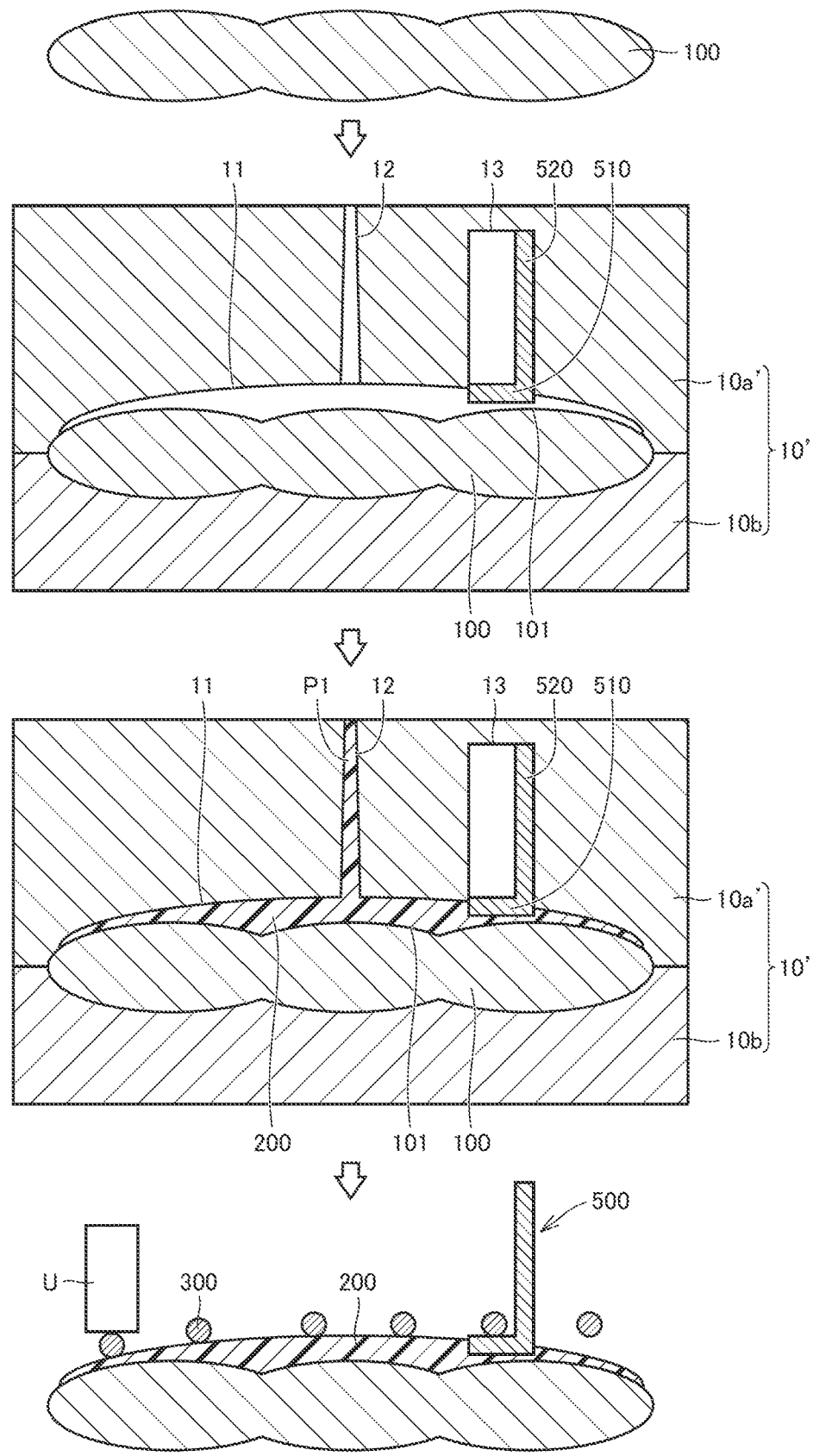
FIG. 4A includes views for explaining steps of a method for manufacturing the three-dimensional structure of the second embodiment. The steps include a step of preparing a first structure of the three-dimensional structure, a step of placing the first structure and a terminal in a first molding die, a step of molding a plastic layer on the first structure, and a step of embedding a conductive wire in the plastic layer and electrically connecting the conductive wire to the terminal.
Figure 4B:
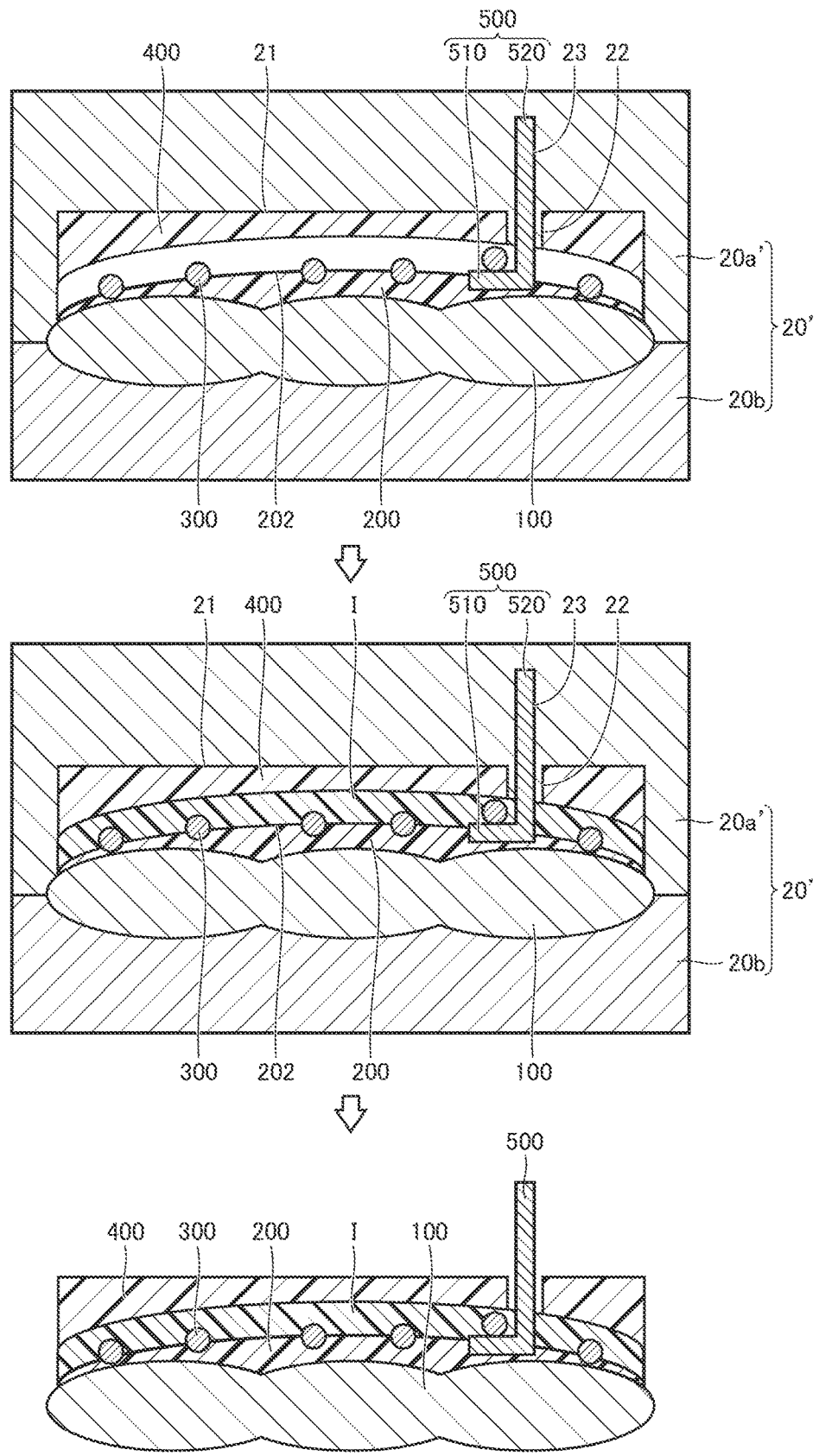
FIG. 4B includes views for explaining subsequent steps, following the steps illustrated in FIG. 4A, of the method for manufacturing the three-dimensional structure of the first embodiment. The subsequent steps include a step of placing the first structure, the terminal, the intermediate layer, the conductive wire, and a second structure in a second molding die, a step of molding an infill layer between the plastic layer and the second structure, and a step of taking out the three-dimensional structure from the second molding die.

The above-described three-dimensional structure S2 described above are manufactured with a method described below and as shown in FIGS. 4A and 4B. FIGS. 4A and 4B illustrate steps of a method for manufacturing the three-dimensional structure S2. The method for manufacturing the three-dimensional structure S2 uses a first molding die 10', which has the same configuration as the first molding die 10 used in the method for manufacturing the three-dimensional structure S1, except that a first mold 10a' further includes accommodation hole 13 communicating with the cavity 11. The method for manufacturing the three-dimensional structure S2 also uses a second molding die 20', which has the same configuration as the second molding die 20 used in the method for manufacturing the three-dimensional structure S1, except that a first mold 20a' further includes projection 22, which extends and projects into the cavity 21, and accommodation hole 23, which is provided in a peripheral area of the projection 22 and the cavity 21 of the first mold 20a'.

First, the first structure 100 of any of the above aspects is prepared (see the first view from the top in FIG. 4A). The terminal or terminals 500 of any of the above aspects are prepared. The first mold 10a' and the second mold 10b of the first molding die 10' are opened, and the first structure 100 is placed on the second mold 10b. The external connection portion 520 of the single terminal 500 and the second part of the embedded portion 510 of the terminal 500, or alternatively the external connection portions 520 of the plurality of terminals 500 and the second parts of the embedded portions 510 of the terminals 500, are inserted into the accommodation hole 13 of the first mold 10a', and the terminal or terminals 500 are fixed to the first mold 10a' with an adhesive, a double-sided tape, or the like. Thereafter, the first mold 10a' and the second mold 10b are closed together. Thus the first structure 100 and the first part of the embedded portion 510 of the terminal 500, or alternatively the first parts of the embedded portions 510 of the terminals 500, are arranged into the cavity 11 of the first molding die 10' (see the second view from the top in FIG. 4A).

Thereafter, molten plastic is injected through the sprue 12 of the first molding die 10' to fill a space on the fixing face 101 of the first structure 100 in the cavity 11 of the first molding die 10' (see the third view from the top in FIG. 4A). At this time, the first part of the embedded portion 510 of the single terminal 500, or alternatively the first parts of the embedded portions 510 of the plurality of terminals 500, are inserted into the molten plastic. The molten plastic cools or otherwise solidifies, so that the plastic layer 200 is molded on the fixing face 101 of the first structure 100, the first part of the embedded portion 510 of the terminal 500, or alternatively the first parts of the embedded portions 510 of the terminals 500, are embedded (insert-molded) in the plastic layer 200, and a first plastic portion P1 is molded inside the sprue 12 of the first molding die 10. The plastic layer 200 is thus fixed onto the fixing face 101 of the first structure 100. Thereafter, the first mold 10a and the second mold 10b are opened, the first structure 100, the terminal or terminals 500, and the plastic layer 200 are taken out, and the first plastic portion P1 is removed.

Alternatively, instead of molding the plastic layer 200 as described above, but the plastic layer 200 molded in a molding die (not shown) is prepared. This plastic layer 200 is also arranged such that the first part of the embedded portion 510 of the single terminal 500, or alternatively the first parts of the embedded portions 510 of the plurality of terminals 500, are embedded (insert-molded) in the plastic layer 200. The first face 201 of the plastic layer 200 is bonding to, and/or engaging with, the fixing face 101 of the first structure 100 in a similar manner described above for the first structure 100, and thereby fixed to the fixing face 101.

After fixing the plastic layer 200, the conductive wire 300 of any of the above aspects is prepared. An ultrasonic head U, which is configured to ultrasonically vibrate, of an ultrasonic generator is operated to apply ultrasonic waves to the conductive wire 300 and to press the conductive wire 300 against the plastic layer 200, and the conductive wire 300 is thereby embedded partly into the plastic layer 200.

Where the step of embedding the conductive wire 300 is the step (1-1) described above, as described above, a portion on the Z-direction side of the part of the conductive wire 300 is sequentially, from the first end portion to the second end portion thereof, embedded into the second face 202 of the plastic layer 200 (see the fourth view from the top in FIG. 4A). In this process, the or each connection portion of the conductive wire 300 is fed onto the embedded portion 510 of the corresponding terminal 500. At this time, the ultrasonic head U of the ultrasonic generator is operated to apply ultrasonic waves onto the or each connection portion of the conductive wire 300 and to press the or each connection portion of the conductive wire 300 against the second part of the embedded portion 510 of the corresponding terminal 500. Thus the or each connection portion of the conductive wire 300 is arranged in position and in contact with the embedded portion 510 of the corresponding terminal 500.

Where the step of embedding the conductive wire 300 is the step (1-2) described above, when the conductive wire 300 is arranged into the linear shape on the second face 202 of the plastic layer 200, the or each connection portion of the conductive wire 300 is disposed on the embedded portion 510 of the corresponding terminal 500. Thereafter, as described above, the portion on the Z-direction side of a part of the conductive wire 300 is sequentially, from the first end portion to the second end portion thereof, embedded into the second face 202 of the plastic layer 200 (not shown) in a manner descried above. In this process, the ultrasonic head U of the ultrasonic generator is operated to apply ultrasonic waves onto the or each connection portion of the conductive wire 300 and to press the or each connection portion of the conductive wire 300 against the second part of the embedded portion 510 of the corresponding terminal 500. Thus the or each connection portion of the conductive wire 300 is arranged in position and in contact with the embedded portion 510 of the corresponding terminal 500.

Where the step of embedding the conductive wire 300 is the step (1-3) described above, when the conductive wire 300 is arranged into the linear shape on the second face 202 of the plastic layer 200, the or each connection portion of the conductive wire 300 is disposed on the embedded portion 510 of the corresponding terminal 500. Thereafter, the ultrasonic head U of the ultrasonic generator is operated to apply ultrasonic waves onto the entire conductive wire 300 and to press the entire conductive wire 300 against the second face 202 of the plastic layer 200, so that a portion on the Z-direction side (embedded portion) of the conductive wire 300 is embedded into the second face 202 of the plastic layer 200 at a time. At this time, the ultrasonic head U of the ultrasonic generator is operated to apply ultrasonic waves onto the or each connection portion of the conductive wire 300 and to press the or each connection portion of the conductive wire 300 against the second part of the embedded portion 510 of the corresponding terminal 500. Thus the or each connection portion of the conductive wire 300 is arranged in position and in contact with the embedded portion 510 of the corresponding terminal 500.

Where the step of embedding the conductive wire 300 is the step (2-1) described above, as described above, a portion on the Z-direction side of a part of one of the wire portions of the conductive wire 300 is sequentially, from the first end portion to the second end portion thereof, embedded into the second face 202 of the plastic layer 200. This step is performed on all the wire portions. Before and after the step of embedding all the wire portions, as described above, a portion on the Z-direction side of the part of the coupling portion is sequentially, from the first end portion to the second end portion thereof, embedded into the second face 202 of the plastic layer 200. In the process of the step of embedding the wire portions or the step of embedding the coupling portion, the ultrasonic head U of the ultrasonic generator is operated to apply ultrasonic waves onto the or each connection portion of the wire portions or the coupling portion of the conductive wire 300 and to press the or each connection portion against the second part of the embedded portion 510 of the corresponding terminal 500. Thus the or each connection portion of the conductive wire 300 is arranged in position and in contact with the embedded portion 510 of the corresponding terminal 500.

Where the step of embedding the conductive wire 300 is the step (2-2) described above, after the plurality of wire portions and the coupling portions of the conductive wire 300 are arranged on the second face 202 of the plastic layer 200, as described above, as described above, a portion on the Z-direction side of a part of one of the wire portions of the conductive wire 300 is sequentially, from the first end portion to the second end portion thereof, embedded into the second face 202 of the plastic layer 200. This step is performed on all the wire portions. Before and after the step of embedding all the wire portions, as described above, a portion on the Z-direction side of the part of the coupling portion is sequentially, from the first end portion to the second end portion thereof, embedded into the second face 202 of the plastic layer 200. In the process of the step of embedding the wire portions or the step of embedding the coupling portion, the ultrasonic head U of the ultrasonic generator is operated to apply ultrasonic waves onto the or each connection portion of the wire portions or the coupling portion of the conductive wire 300 and to press the or each connection portion against the second part of the embedded portion 510 of the corresponding terminal 500. Thus the or each connection portion of the conductive wire 300 is arranged in position and in contact with the embedded portion 510 of the corresponding terminal 500.

Where the step of embedding the conductive wire 300 is the above (2-3), the plurality of wire portions and the coupling portion of the conductive wire 300 are arranged on the second face 202 of the plastic layer 200. Thereafter, the ultrasonic head U of the ultrasonic generator is operated to apply ultrasonic waves onto the entire conductive wire 300 and to press the entire conductive wire 300 against the second face 202 of the plastic layer 200, so that a portion on the Z-direction side of t the conductive wire 300 is embedded into the second face 202 of the plastic layer 200 at a time. At this time, the ultrasonic head U of the ultrasonic generator is operated to press the or each connection portion of the wire portions or the coupling portion of the conductive wire 300 against the second part of the embedded portion 510 of the corresponding terminal 500. Thus the or each connection portion of the conductive wire 300 is arranged in position and in contact with the embedded portion 510 of the corresponding terminal 500.

Thus the embedded portion on the Z-direction side of the conductive wire 300 is embedded into the second face 202 of the plastic layer 200, and the protruded portion on the Z'-direction side of the conductive wire 300 protrudes from the second face 202 of the plastic layer 200 in the Z' direction, and the or each connection portion of the conductive wire 300 is arranged in position and in contact with the embedded portion 510 of the corresponding terminal 500.

After the step of embedding the conductive wire 300, the or each connection portion of the conductive wire 300 is electrically and mechanically connected to the embedded portion 510 of the corresponding terminal 500 by thermal swaging, welding (e.g., laser welding, arc welding, resistance welding, ultrasonic welding, or the like), or soldering. Where the conductive wire 300 includes the fusion layer but not the insulating layer, the or each connection portion of the conductive wire 300 is heated and pressed onto the embedded portion 510 of the corresponding terminal 500 using a swaging horn C of a heat swaging machine, the heat melts a part of the fusion layer that covers the or each connection part of the conductive wire 300, and the or each connection portion is exposed from the fusion layer and electrically and mechanically connected to the embedded portion 510 of the corresponding terminal 500; or alternatively heat generated by welding or soldering melts a part of the fusion layer that covers the or each connection part of the conductive wire 300, and the or each connection portion is exposed from the fusion layer and electrically and mechanically connected to the embedded portion 510 of the corresponding terminal 500. Where the conductive wire 300 includes the insulating layer and the fusion layer, the or each connection portion of the conductive wire 300 is heated and pressed onto the embedded portion 510 of the corresponding terminal 500 using a swaging horn C of a heat swaging machine, the heat melts a part of the fusion layer and a part of the insulating layer that cover the or each connection part of the conductive wire 300, and the or each connection portion is exposed from the insulating layer and the fusion layer and electrically and mechanically connected to the embedded portion 510 of the corresponding terminal 500; or alternatively heat generated by welding or soldering melts a part of the fusion layer and a part of the insulating layer that cover the or each connection part of the conductive wire 300, and the or each connection portion is exposed from the insulating layer and the fusion layer and electrically and mechanically connected to the embedded portion 510 of the corresponding terminal 500. Where the conductive wire 300 includes neither the insulating layer nor the fusion layer, the or each connection portion of the conductive wire 300 is heated and pressed onto the embedded portion 510 of the corresponding terminal 500 using a swaging horn C of a heat swaging machine, and the or each connection portion is electrically and mechanically connected to the embedded portion 510 of the corresponding terminal 500; or alternatively the or each connection portion is electrically and mechanically connected to the embedded portion 510 of the corresponding terminal 500 by welding or soldering. Where the plastic layer 200 is fixed on the fixing face 101 of the first structure 100 by bonding and/or engagement, the plastic layer 200 may be fixed onto the fixing face 101 of the first structure 100 by bonding and/or engagement after the step of connecting the conductive wire 300.

After the step of connecting the conductive wire 300, the second structure 400 is prepared. The second structure 400 is fixed to the second face 202 of the plastic layer 200 by bonding and/or engagement so as to cover the protruded portion of the conductive wire 300. At this time, the second portion of the external connection portion 520 of the single terminal 500, or alternatively the second portions of the external connection portions 520 of the plurality of the terminals 500, are inserted into the through hole 410 of the second structure 400. A gap is generated between the first face of the second structure 400 and the second face 202 of the plastic layer 200.

Thereafter, a first mold 20a′ and a second mold 20b of the second molding die 20′ are opened, and the first structure 100, the plastic layer 200, the conductive wire 300, the terminal or terminals 500, and the second structure 400 are placed onto the second mold 20b. Thereafter, the first mold 20a and the second mold 20b are closed together. At this time, the first structure 100, the plastic layer 200, the conductive wire 300, the embedded portion 510 of the single terminal 500 or alternatively the embedded portions 510 of the plurality of terminals 500, the first portion of the external connection portion 520 of the terminal 500 or alternatively the first portions of the external connection portions 520 of the terminals 500, and the second structure 400 are disposed into the cavity 21 of the second molding die 20; the second portion of the external connection portion 520 of the terminal 500, or alternatively the second portions of the external connection portions 520 of the terminals 500, are accommodated in the accommodation hole 23 of the first mold 20a′ (see the first view from the top in FIG. 4B); and the projection 22 is fitted into the through hole 410 of the second structure 400. Thereafter, molten plastic is injected through a sprue (not shown) of the second molding die 20′ to fill the gap between the first face of the second structure 400 and the second face 202 of the plastic layer 200 in the cavity 21 of the second molding die 20′ (see the second view from the top in FIG. 4B). At this time, the protruded portion of the conductive wire 300, the second part of the embedded portion 510 of the single terminal 500 or alternatively the second parts of the embedded portions 510 of the plurality of terminals 500, and the first portion of the external connection portion 520 of the terminal 500 or the first portions of the external connection portions 520 of the terminals 500 are inserted into the molten plastic. The molten plastic cools or otherwise solidifies, so that the infill layer I is formed between the first face of the second structure 400 and the second face 202 of the plastic layer 200, the protruded portion of the conductive wire 300, the second part of the embedded portion 510 of the terminal 500 or alternatively the second parts of the embedded portions 510 of the terminals 500, and the first portion of the external connection portion 520 of the terminal 500 or alternatively the first portions of the external connection portions 520 of the terminals 500 are embedded (insert-molded) into the infill layer I, and the second plastic portion is formed inside the sprue of the second molding die 20′. Thereafter, the first mold 20a and the second mold 20b are opened, the first structure 100, the plastic layer 200, the conductive wire 300, the second structure 400, the terminal or terminals 500, and the infill layer I are taken out (see the third view from the top in FIG. 4B), and the second plastic portion is removed. At this time, the projection 22 comes out of the through hole 410 of the second structure 400, resulting in that the second portion of the external connection portion 520 of the terminal 500 or alternatively the second portions of the external connection portions 520 of the terminals 500 extends through, or is located in, the through hole 410. It should be noted that the projection 22 may be omitted. Where the projection 22 is omitted, the second structure 400 may be provided with a single through hole 410 or a plurality of through holes 410. The or each through hole 410 may have substantially the same shape as the outer shape of the second portion of the external connection portion 520 of the corresponding terminal 500 excluding the distal end portion.

Where the body 600 is separate from the second structure 400, the body 600 is prepared. The body 600 is fixed to the second structure 400, and the distal end portion of the external connection portion 520 of the single terminal 500, or alternatively the distal end portions of the external connection portions 520 of the plurality of terminals 500, are inserted into the through hole 610 of the body 600. Where the body 600 is integrated with the second structure 400, it is possible to prepare the second structure 400 provided with the body 600.

Where the second structure 400 and the infill layer I are omitted, omitted are the step of fixing the second structure 400 to the second face 202 of the plastic layer 200 and the step of molding the infill layer I.

Where the infill layer I is omitted and the second structure 400 is provided, the first structure 100, the plastic layer 200, the conductive wire 300, and the terminal or terminals 500 may be arranged in a cavity of a molding die (not shown), molten plastic is injected into the cavity, and then solidified to mold the second structure 400 on the second face 202 of the plastic layer 200, with the protruded portion of the conductive wire 300 insert-molded in the second structure 400. Where the body 600 is integrated with the second structure 400, the body 600 may also be molded at the time of molding the second structure 400. Alternatively, the second structure 400 may be fixed to the second face 202 of the plastic layer 200 by bonding or engagement.

The three-dimensional structure S2 is manufactured in one of manners described above. Such three-dimensional structure S2 and a manufacturing method thereof provides technical features and effects similar to those of the three-dimensional structure S1 and the manufacturing method thereof. Moreover, when the conductive wire 300 is embedded into the second face 202 of the plastic layer 200 with the ultrasonic head U of the ultrasonic generator, the or each connection portion of the conductive wire 300 is pressed against the second part of the embedded portion 510 of the corresponding terminal 500 with the ultrasonic head U of the ultrasonic generator, so that the or each connection portion of the conductive wire 300 is arranged in position and in contact with the embedded portion 510 of the corresponding terminal 500. This facilitates electric and mechanical connection of the or each connection portion of the conductive wire 300 with the corresponding terminal 500 by heat swaging, welding, or soldering. Furthermore, since the at least one terminal 500 is externally connectable, it is easier to externally connect the three-dimensional structure S1, as compared with the case where the external connection is made through the at least one connection portion of the conductive wire 300. Where the three-dimensional structure S2 includes the connector, it is further easier to connect the three-dimensional structure S2 to an external device, by connecting the body 600 of the three-dimensional structure S2 to a mating connector of the external device.

Third Embodiment

Figure 5:
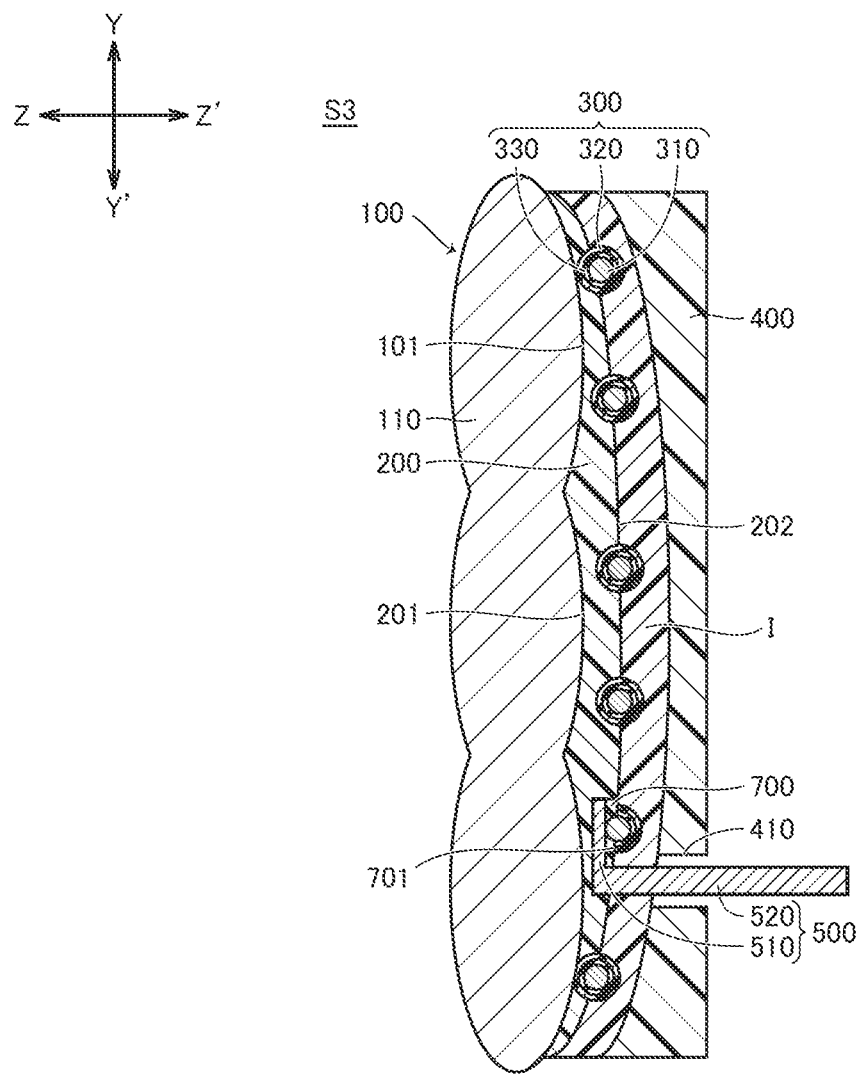
FIG. 5 is a schematic cross-sectional view of a three-dimensional structure according to a third embodiment of the invention.

Hereinafter described is a three-dimensional structure S3 according to a plurality of embodiments of the invention, including a third embodiment and variants thereof, with reference to FIG. 5. FIG. 5 illustrates the three-dimensional structure S3 of the third embodiment. FIG. 5 indicates a Z-Z' direction, which is a thickness direction of the three-dimensional structure S2. FIG. 5 also indicates a Y-Y' direction, which is a widthwise direction of the three-dimensional structure S2. FIG. 1B can be referred to for the indication of the X-X' direction, which is a lengthwise direction of the three-dimensional structure S3.

The three-dimensional structure S3 has the same configuration as that of the three-dimensional structure S2, except that the three-dimensional structure S3 further includes at least one binder layer 700. The three-dimensional structure S3 will now be described focusing on the differences from the three-dimensional structure S2 and omitting overlapping descriptions.

The at least one binder layer 700 is provided in accordance with the number of the at least one terminal 500. For convenience of description, the at least one binder layer 700 may be hereinafter referred to as "the or each binder layer 700". Where the at least one binder layer 700 is a single binder layer 700, the binder layer 700 of "the or each binder layer 700" means the single binder layer 700, and where the at least one binder layer 700 is a plurality of binder layers, each binder layer 700 of "the or each binder layer 700" means each of the binder layers 700.

The or each binder layer 700 is a thermoplastic plastic, such as hot melt adhesive, and provided on a face on the Z'-direction side of the embedded portion 510 of the corresponding terminal 500. The or each binder layer 700 includes an exposed face 701 on the Z'-direction side.

The embedded portion 510 of the or each terminal 500 is embedded in the second face 202 of the plastic layer 200 such that the exposed face 701 of the binder layer 700 on the embedded portion 510 is substantially flush with the second face 202 of the plastic layer 200. In this case, the entire embedded portion 510 of the or each terminal 500 is embedded in the plastic layer 200, and the binder layer 700 on the embedded portion 510 is embedded in the plastic layer 200 such that the exposed face 701 is exposed from the second face 202 of the plastic layer 200.

The conductive wire 300 of the three-dimensional structure S3 includes the wire body 310, may additionally include the fusion layer 320, may additionally include the fusion layer 320 and the insulating layer 330 (see FIG. 5), or may include neither the fusion layer 320 nor the insulating layer 330. Where the fusion layer 320 is provided but the insulating layer 330 is not provided, the or each connection portion of the conductive wire 300 is exposed from the fusion layer 320 and electrically and mechanically connected to the embedded portion 510 of the corresponding terminal 500. Where the fusion layer 320 and the insulating layer 330 are provided, the or each connection portion of the conductive wire 300 is exposed from the fusion layer 320 and the insulating layer 330, and electrically and mechanically connected to the embedded portion 510 of the corresponding terminal 500. Where neither the fusion layer 320 nor the insulating layer 330 are provided, the or each connection portion of the conductive wire 300 is electrically and mechanically connected to the embedded portion 510 of the corresponding terminal 500. In the three-dimensional structure S3, the fusion layer is denoted by reference numeral 320, and the insulating layer is denoted by reference numeral 330. However, the fusion layer 320 and the insulating layer 330 have the same or a similar configuration as the fusion layer and the insulating layer of the three-dimensional structures S1 and S2.

The first structure 100 of the three-dimensional structure S3 may or may not include the at least one functional layer 120.

Figure 6A:
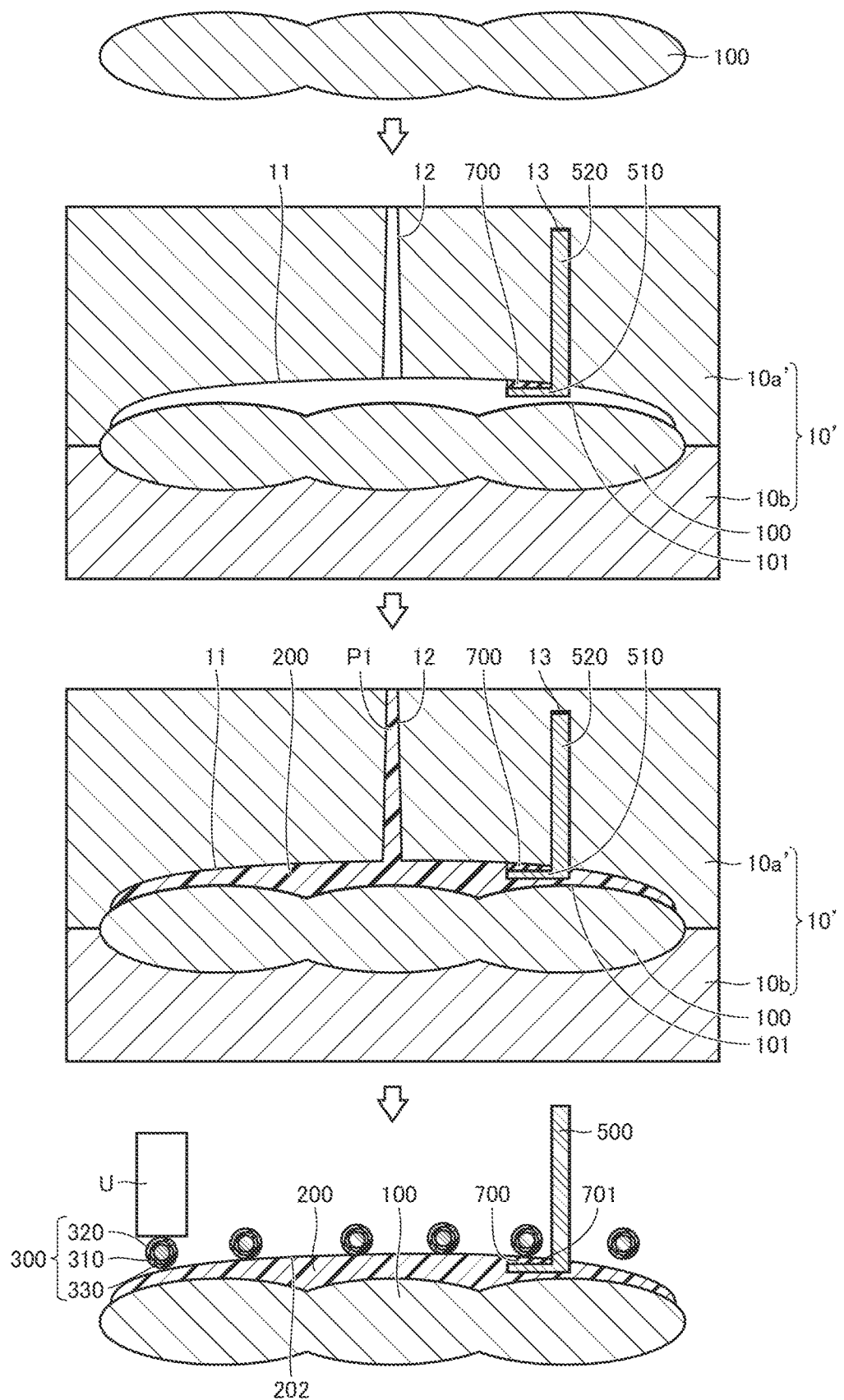
FIG. 6A includes views for explaining steps of a method for manufacturing the above three-dimensional structure. The steps include a step of preparing a first structure of the three-dimensional structure, a step of placing the first structure and a terminal in a first molding die, a step of molding a plastic layer on the first structure, and a step of embedding a conductive wire in the plastic layer.
Figure 6B:
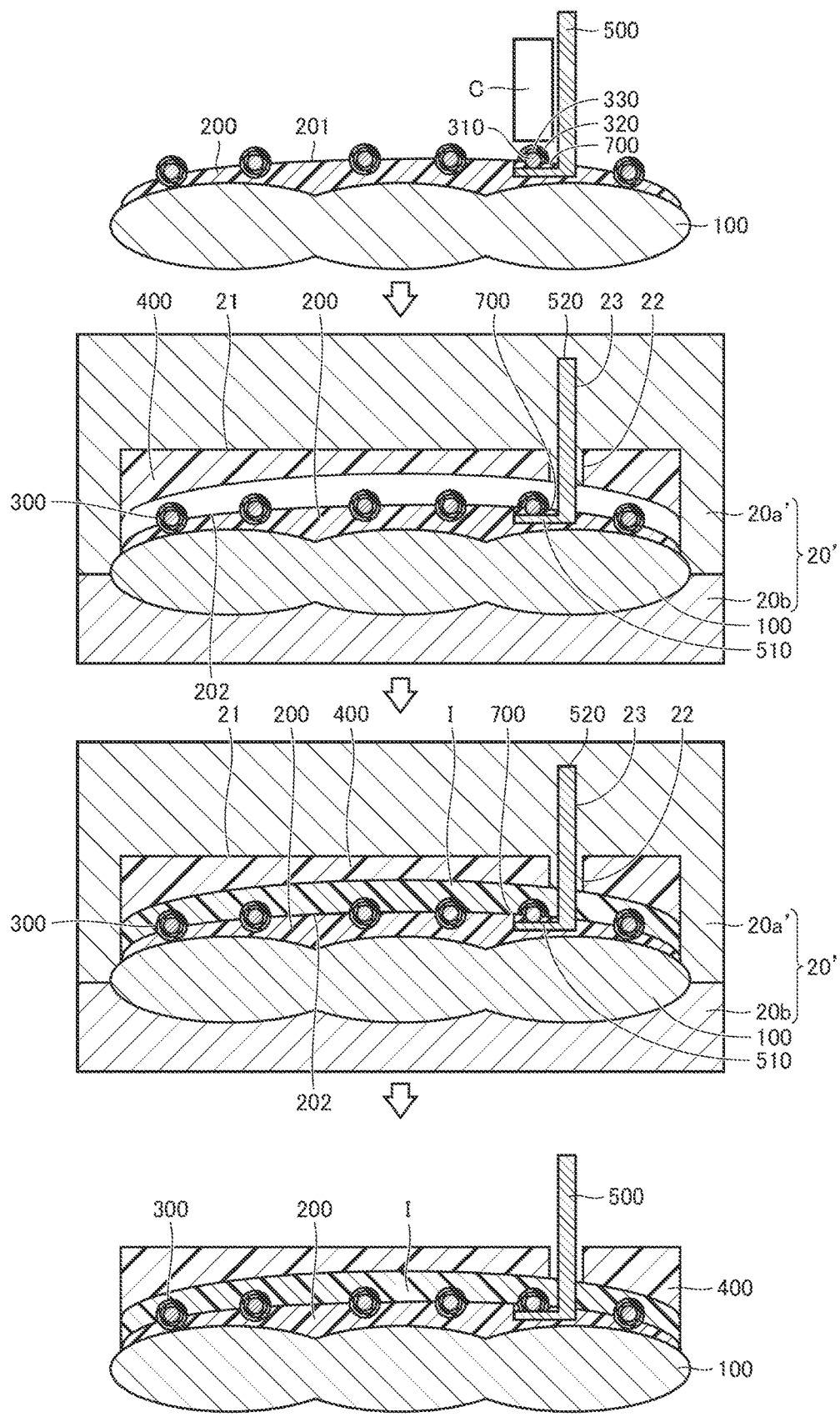
FIG. 6B includes views for explaining subsequent steps, following the steps illustrated in FIG. 6A, of the method for manufacturing the above three-dimensional structure. The subsequent steps include a step of connecting the conductive wire to the terminal, a step of placing the first structure, the terminal, the intermediate layer, the conductive wire, and a second structure in a second molding die, a step of molding an infill layer between the plastic layer and the second structure, and a step of taking out the three-dimensional structure from the second molding die.

The above-described three-dimensional structure S3 described above are manufactured with a method described below and as shown FIGS. 6A and 6B. FIGS. 6A and 6B illustrate steps of a method for manufacturing the three-dimensional structure S3.

First, the first structure 100 of any of the above aspects is prepared (see the first view from the top in FIG. 6A). The terminal or terminals 500 and the binder layer or layers 700 of any of the above aspects are prepared. The single binder layer 700 is provided on the embedded portion 510 of the single terminal 500, or alternatively the plurality of binder layers 700 is provided on the corresponding embedded portions 510 of the plurality of terminals 500. Hereinafter, the binder layer 700 on the embedded portion 510 of the single terminal 500 may be referred to as a "corresponding binder layer 700", and the plurality of binder layers 700 on the corresponding embedded portions 510 of terminals 500 may be referred to as "corresponding binder layers 700".

The first mold 10a' and the second mold 10b of the first molding die 10' are opened, and the first structure 100 is placed on the second mold 10b. The external connection portion 520 of the single terminal 500, or alternatively the external connection portions 520 of the plurality of terminals 500, are inserted into the accommodation hole 13 of the first mold 10a', the exposed face 701 of the corresponding binder layer 700, or alternatively the exposed faces 701 of the corresponding binder layers 700, are is brought into contact with an edge portion of the accommodation hole 13 of the first mold 10a', and the terminal or terminals 500 are fixed to the first mold 10a' with an adhesive, a double-sided tape, or the like. Thereafter, the first mold 10a' and the second mold 10b are closed together. In this manner, the first structure 100, the embedded portion 510 of the single terminal 500 and the corresponding binder layer 700, or alternatively the embedded portions 510 of the plurality of terminals 500 and the corresponding binder layers 700, are arranged into the cavity 11 of the first molding die 10' (see the second view from the top in FIG. 6A).

Thereafter, molten plastic is injected through the sprue 12 of the first molding die 10' to fill a space on the fixing face 101 of the first structure 100 in the cavity 11 of the first molding die 10' (see the third view from the top in FIG. 6A).

At this time, the embedded portion 510 of the single terminal 500 and the corresponding binder layer 700, or alternatively the embedded portions 510 of the plurality of terminals 500 and the corresponding binder layers 700, are inserted into the molten plastic, but the exposed face 701 of the corresponding binder layer 700, or alternatively the exposed faces 701 of the corresponding binder layers 700, will not be inserted into the molten plastic. This is because the exposed face 701, or alternatively the exposed faces 701, are in contact with the edge portion of the accommodation hole 13 of the first mold 10a'. The molten plastic cools or otherwise solidifies, so that the plastic layer 200 is molded on the fixing face 101 of the first structure 100, and the embedded portion 510 of the single terminal 500 or alternatively the embedded portions 510 of the plurality of terminals 500, and the corresponding binder layer 700 excluding the exposed face 701 or alternatively the corresponding binder layers 700 excluding the exposed faces 701 are embedded (insert-molded) in the plastic layer 200, and the first plastic portion P1 is molded in the sprue 12 of the first molding die 10'. The plastic layer 200 is thus fixed onto the fixing face 101 of the first structure 100, and the second face 202 of the plastic layer 200 becomes substantially flush with the exposed face 701 of the binder layer 700, or alternatively with the exposed faces 701 of the binder layers 700. Thereafter, the first mold 10a and the second mold 10b are opened, the first structure 100, the terminal or terminals 500, and the plastic layer 200 are taken out, and the first plastic portion P1 is removed.

Alternatively, instead of molding the plastic layer 200 on the fixing face 101 of the first structure 100 as described above, the plastic layer 200 molded in a molding die not shown (which may be referred to as a "molding die for the plastic layer") is prepared. This plastic layer 200 is also arranged such that the embedded portion 510 of the single terminal 500 and the corresponding binder layer 700, or alternatively the embedded portions 510 of the plurality of terminals 500 and the corresponding binder layers 700, are insert-molded into the plastic layer 200, and that the second face 202 of the plastic layer 200 is substantially flush with the exposed face or faces 701 of the corresponding binder layer or layers 700. The first face 201 of the plastic layer 200 is bonding to, and/or engaging with, the fixing face 101 of the first structure 100 in a similar manner described above for the first structure 100, and thereby fixed to the fixing face 101. It should be noted that the molding die for the plastic layer has the same configuration as the first molding die 10', except that the cavity conforms to the outer shape of the plastic layer 200.

The embedded portion 510 of the single terminal 500, or alternatively the embedded portions 510 of the plurality of terminals 500, may not be insert-molded in the plastic layer 200 together with the corresponding binder layer or layers 700. Instead, the face on the Z'-direction side of the embedded portion 510 of the terminal 500, or alternatively the faces on the Z'-direction side of the embedded portions 510 of the terminals 500, may be brought into abutment with a projection of the first mold of the first molding die 10', or alternatively with a projection of the first mold of the molding die for the plastic layer; and in this state, the embedded portion 510 of the terminal 500, or alternatively the embedded portions 510 of terminals 500, may be insert-molded into the plastic layer 200 in a manner described above. In this case, the second face 202 of the plastic layer 200 is formed with a recess, into which the embedded portion or portions 510 of the terminal or terminals 500 are exposed. Onto the embedded portion or portions 510 of the terminal or terminals 500 in the recess, the corresponding binder layer or layers 700 are applied.

After fixing the plastic layer 200, the conductive wire 300 of any of the above aspects is prepared. An ultrasonic head U, which is configured to ultrasonically vibrate, of an ultrasonic generator is operated to apply ultrasonic waves onto the conductive wire 300 and to press the conductive wire 300 against the plastic layer 200 with the ultrasonic head U, and the conductive wire 300 is thereby embedded partly into the plastic layer 200.

Where the step of embedding the conductive wire 300 is the step (1-1) described above, as described above, the portion on the Z-direction side of the part of the conductive wire 300 is sequentially, from the first end portion to the second end portion thereof, embedded into the second face 202 of the plastic layer 200 (see the fourth view from the top in FIG. 6A). In this process, the or each connection portion of the conductive wire 300 is fed onto the embedded portion 510 of the corresponding terminal 500. At this time, the ultrasonic head U of the ultrasonic generator is operated to apply ultrasonic waves onto the or each connection portion of the conductive wire 300 and to press the or each connection portion of the conductive wire 300 against the corresponding binder layer 700 on the embedded portion 510 of the corresponding terminal 500. Thus the or each connection portion of the conductive wire 300 is bonded to the corresponding binder layer 700 on the embedded portion 510 of the corresponding terminal 500.

Where the step of embedding the conductive wire 300 is the step (1-2) described above, when the conductive wire 300 is arranged into the linear shape on the second face 202 of the plastic layer 200, the or each connection portion of the conductive wire 300 is disposed on the embedded portion 510 of the corresponding terminal 500. Thereafter, as described above, the portion on the Z-direction side of a part of the conductive wire 300 is sequentially, from the first end portion to the second end portion thereof, embedded into the second face 202 of the plastic layer 200 (not shown) in a manner descried above. In this process, the ultrasonic head U of the ultrasonic generator is operated to apply ultrasonic waves onto the or each connection portion of the conductive wire 300 and to press the or each connection portion of the conductive wire 300 against the corresponding binder layer 700 on the embedded portion 510 of the corresponding terminal 500. Thus the or each connection portion of the conductive wire 300 is bonded to the corresponding binder layer 700 on the embedded portion 510 of the corresponding terminal 500.

Where the step of embedding the conductive wire 300 is the step (1-3) described above, when the conductive wire 300 is arranged into the linear shape on the second face 202 of the plastic layer 200, the or each connection portion of the conductive wire 300 is disposed on the embedded portion 510 of the corresponding terminal 500. Thereafter, the ultrasonic head U of the ultrasonic generator is operated to apply ultrasonic waves onto the entire conductive wire 300 and to press the entire conductive wire 300 against the second face 202 of the plastic layer 200, so that a portion on the Z-direction side (embedded portion) of the conductive wire 300 is embedded into the second face 202 of the plastic layer 200 at a time. At this time, the ultrasonic head U of the ultrasonic generator is operated to apply ultrasonic waves onto the or each connection portion of the conductive wire 300 and to press the or each connection portion of the conductive wire 300 against the corresponding binder layer 700 on the embedded portion 510 of the corresponding terminal 500. Thus the or each connection portion of the conductive wire 300 is bonded to the corresponding binder layer 700 on the embedded portion 510 of the corresponding terminal 500.

Where the step of embedding the conductive wire 300 is the step (2-1) described above, as described above, a portion on the Z-direction side of a part of one of the wire portions of the conductive wire 300 is sequentially, from the first end portion to the second end portion thereof, embedded into the second face 202 of the plastic layer 200. This step is performed on all the wire portions. Before and after the step of embedding all the wire portions, as described above, a portion on the Z-direction side of the part of the coupling portion is sequentially, from the first end portion to the second end portion thereof, embedded into the second face 202 of the plastic layer 200. In the process of the step of embedding the wire portions or the step of embedding the coupling portion, the ultrasonic head U of the ultrasonic generator is operated to apply ultrasonic waves onto the or each connection portion of the wire portions or the coupling portion of the conductive wire 300 and to press the or each connection portion the corresponding binder layer 700 on the embedded portion 510 of the corresponding terminal 500. Thus the or each connection portion of the conductive wire 300 is bonded to the corresponding binder layer 700 on the embedded portion 510 of the corresponding terminal 500.

Where the step of embedding the conductive wire 300 is the step (2-2) described above, after the plurality of wire portions and the coupling portions of the conductive wire 300 are arranged on the second face 202 of the plastic layer 200, as described above, as described above, a portion on the Z-direction side of a part of one of the wire portions of the conductive wire 300 is sequentially, from the first end portion to the second end portion thereof, embedded into the second face 202 of the plastic layer 200. This step is performed on all the wire portions. Before and after the step of embedding all the wire portions, as described above, a portion on the Z-direction side of the part of the coupling portion is sequentially, from the first end portion to the second end portion thereof, embedded into the second face 202 of the plastic layer 200. In the process of the step of embedding the wire portions or the step of embedding the coupling portion, the ultrasonic head U of the ultrasonic generator is operated to apply ultrasonic waves onto the or each connection portion of the wire portions or the coupling portion of the conductive wire 300 and to press the or each connection portion the corresponding binder layer 700 on the embedded portion 510 of the corresponding terminal 500. Thus the or each connection portion of the conductive wire 300 is bonded to the corresponding binder layer 700 on the embedded portion 510 of the corresponding terminal 500.

Where the step of embedding the conductive wire 300 is the above (2-3), the plurality of wire portions and the coupling portion of the conductive wire 300 are arranged on the second face 202 of the plastic layer 200. Thereafter, the ultrasonic head U of the ultrasonic generator is operated to apply ultrasonic waves onto the entire conductive wire 300 and to press the entire conductive wire 300 against the second face 202 of the plastic layer 200, so that a portion on the Z-direction side of the conductive wire 300 is embedded into the second face 202 of the plastic layer 200 at a time. At this time, the ultrasonic head U of the ultrasonic generator is operated to press the or each connection portion of the wire portions or the coupling portion of the conductive wire 300 against the corresponding binder layer 700 on the embedded portion 510 of the corresponding terminal 500. Thus the or each connection portion of the conductive wire 300 is bonded to the corresponding binder layer 700 on the embedded portion 510 of the corresponding terminal 500.

Thus the embedded portion on the Z-direction side of the conductive wire 300 is embedded into the second face 202 of the plastic layer 200, and the protruded portion on the Z'-direction side of the conductive wire 300 protrudes from the second face 202 of the plastic layer 200 in the Z' direction, and the or each connection portion of the conductive wire 300 is kept bonded to the corresponding binder layer 700 on the embedded portion 510 of the corresponding terminal 500.

After the step of embedding the conductive wire 300, the or each connection portion of the conductive wire 300 is mechanically and electrically connected to the embedded portion 510 of the corresponding terminal 500 by thermal swaging, welding (e.g., laser welding, arc welding, resistance welding, ultrasonic welding, or the like), or soldering. Where the conductive wire 300 includes the fusion layer 320 but not the insulating layer 330, the or each connection portion of the conductive wire 300 is heated and pressed onto the embedded portion 510 of the corresponding terminal 500 using a swaging horn C of a heat swaging machine, the heat melts a part of the fusion layer 320 that covers the or each connection part of the conductive wire 300 and melts the corresponding binder layer 700, the or each connection portion is exposed from the fusion layer 320, the embedded portion 510 of the corresponding terminal 500 is exposed from the corresponding binder layer 700, and the or each connection portion is electrically and mechanically connected to the embedded portion 510 of the corresponding terminal 500; or alternatively heat generated by welding or soldering melts a part of the fusion layer 320 that covers the or each connection part of the conductive wire 300 and melts the corresponding binder layer 700, the or each connection portion is exposed from the fusion layer 320, the embedded portion 510 of the corresponding terminal 500 is exposed from the corresponding binder layer 700, and the or each connection portion is electrically and mechanically connected to the embedded portion 510 of the corresponding terminal 500. Where the conductive wire 300 includes the insulating layer 330 and the fusion layer 320, the or each connection portion of the conductive wire 300 is heated and pressed onto the embedded portion 510 of the corresponding terminal 500 using a swaging horn C of a heat swaging machine, the heat melts a part of the fusion layer 320 and a part of the insulating layer 330 that cover the or each connection part of the conductive wire 300 and melts the corresponding binder layer 700, the or each connection portion is exposed from the insulating layer 330 and the fusion layer 320, the embedded portion 510 of the corresponding terminal 500 is exposed from the corresponding binder layer 700, and the or each connection portion is electrically and mechanically connected to the embedded portion 510 of the corresponding terminal 500; or alternatively heat generated by welding or soldering melts a part of the fusion layer 320 and a part of the insulating layer 330 that cover the or each connection part of the conductive wire 300 and melts the corresponding binder layer 700, the or each connection portion is exposed from the insulating layer 330 and the fusion layer 320, the embedded portion 510 of the corresponding terminal 500 is exposed from the corresponding binder layer 700, and the or each connection portion is electrically and mechanically connected to the embedded portion 510 of the corresponding terminal 500. Where the conductive wire 300 includes neither the insulating layer 330 nor the fusion layer 320, the or each connection portion of the conductive wire 300 is heated and pressed onto the embedded portion 510 of the corresponding terminal 500 using a swaging horn C of a heat swaging machine, the heat melts the corresponding binder layer 700, the embedded portion 510 of the corresponding terminal 500 is exposed from the corresponding binder layer 700, and the or each connection portion is electrically and mechanically connected to the embedded portion 510 of the corresponding terminal 500; or alternatively heat generated by welding or soldering melts the corresponding binder layer 700, the embedded portion 510 of the corresponding terminal 500 is exposed from the corresponding binder layer 700, and the or each connection portion is electrically and mechanically connected to the embedded portion 510 of the corresponding terminal 500. Where the plastic layer 200 is fixed on the fixing face 101 of the first structure 100 by bonding and/or engagement, the plastic layer 200 may be fixed onto the fixing face 101 of the first structure 100 by bonding and/or engagement after the step of connecting the conductive wire 300.

After the step of connecting the conductive wire 300, the second structure 400 is prepared. The second structure 400 is fixed to the second face 202 of the plastic layer 200 by bonding and/or engagement so as to cover the protruded portion of the conductive wire 300. At this time, the second portion of the external connection portion 520 of the single terminal 500, or alternatively the second portions of the external connection portions 520 of the plurality of terminals 500, are inserted into the through hole 410 of the second structure 400. A gap is generated between the first face of the second structure 400 and the second face 202 of the plastic layer 200.

Thereafter, a first mold 20a' and a second mold 20b of the second molding die 20' are opened, and the first structure 100, the plastic layer 200, the conductive wire 300, the terminal or terminals 500, the corresponding binder layer or layers 700, and the second structure 400 are placed onto the second mold 20b. Thereafter, the first mold 20a and the second mold 20b are closed together. At this time, the first structure 100, the plastic layer 200, the conductive wire 300, the embedded portion 510 of the terminal 500 or alternatively the embedded portions 510 of the terminals 500, the first portion of the external connection portion 520 of the terminal 500 or alternatively the first portions of the external connection portions 520 of the terminals 500, the corresponding binder layer or layers 700, and the second structure 400 are disposed into the cavity 21 of the second molding die 20; the second portion of the external connection portion 520 of the terminal 500 or alternatively the second portions of the external connection portions 520 of the terminals 500 is accommodated in the accommodation hole 23 of the first mold 20a' (see the first view from the top in FIG. 6B); and the projection 22 is fitted into the through hole 410 of the second structure 400. Thereafter, molten plastic is injected through a sprue (not shown) of the second molding die 20' to fill the gap between the first face of the second structure 400 and the second face 202 of the plastic layer 200 in the cavity 21 of the second molding die 20' (see the second view from the top in FIG. 6B). At this time, the protruded portion of the conductive wire 300, and the first portion of the external connection portion 520 of the terminal 500, or alternatively the first portions of the external connection portions 520 of the terminals 500, are inserted into the molten plastic; and the exposed face 701 of the corresponding binder layer 700, or alternatively the exposed faces 701 of the corresponding binder layers 700, are covered with the molten plastic. The molten plastic cools or otherwise solidifies. As a result, the infill layer I is formed between the first face of the second structure 400 and the second face 202 of the plastic layer 200; the protruded portion of the conductive wire 300, and the first portion of the external connection portion 520 of the terminal 500 or alternatively the first portions of the external connection portions 520 of the terminals 500 are embedded (insert-molded) into the infill layer I; and the second plastic portion is formed inside the sprue of the second molding die 20'. Thereafter, the first mold 20a and the second mold 20b are opened, the first structure 100, the plastic layer 200, the conductive wire 300, the terminal or terminals 500, the corresponding binder layer or layers 700, the second structure 400, and the infill layer I are taken out (see the third view from the top in FIG. 6B), and the second plastic portion is removed. At this time, the projection 22 comes out of the through hole 410 of the second structure 400, resulting in that the external connection portion 520 of the terminal 500 or alternatively the external connection portions 520 of the terminals 500 extend through, or is located in, the through hole 410. It should be noted that the projection 22 may be omitted. Where the projection 22 is omitted, the second structure 400 may be provided with a single through hole 410 or a plurality of through holes 410. The or each through hole 410 may have substantially the same shape as the outer shape of the second portion of the external connection portion 520 of the corresponding terminal 500 excluding the distal end portion.

Where the body 600 is separate from the second structure 400, the body 600 is prepared. The body 600 is fixed to the second structure 400, and the distal end portion of the external connection portion 520 of the single terminal 500, or alternatively the distal end portions of the external connection portions 520 of the plurality of terminals 500, are inserted into the through hole 610 of the body 600. Where the body 600 is integrated with the second structure 400, it is possible to prepare the second structure 400 provided with the body 600.

Where the second structure 400 and the infill layer I are omitted, omitted are the step of fixing the second structure 400 to the second face 202 of the plastic layer 200 and the step of molding the infill layer I.

Where the infill layer I is omitted and the second structure 400 is provided, the first structure 100, the plastic layer 200, the conductive wire 300, and the terminal or terminals 500, and the corresponding binder layer or layers 700 may be arranged in a cavity of a molding die (not shown), molten plastic is injected into the cavity, and then solidified to mold the second structure 400 on the second face 202 of the plastic layer 200, with the protruded portion of the conductive wire 300 and the first portion of the external connection portion 520 of the terminal 500, or alternatively the first portions of the external connection portions 520 of the terminals 500, insert-molded in the second structure 400. Where the body 600 is integrated with the second structure 400, the body 600 may also be molded at the time of molding the second structure 400. Alternatively, the second structure 400 may be fixed to the second face 202 of the plastic layer 200 by bonding or engagement.

The three-dimensional structure S3 is manufactured in one of manners described above. Such three-dimensional structure S3 and a manufacturing method thereof provides technical features and effects similar to those of the three-dimensional structure S1 and the manufacturing method thereof. Moreover, when the conductive wire 300 is embedded into the second face 202 of the plastic layer 200 with the ultrasonic head U of the ultrasonic generator, the or each connection portion of the conductive wire 300 is pressed against the corresponding binder layer 700 on the embedded portion 510 of the corresponding terminal 500 with the ultrasonic head U of the ultrasonic generator, so that the or each connection portion of the conductive wire 300 is kept bonded to the corresponding binder layer 700 on the embedded portion 510 of the corresponding terminal 500. This facilitates mechanical and electric and connection of the or each connection portion of the conductive wire 300 with the corresponding terminal 500 by heat swaging, welding, or soldering. Further, it is possible to suppress the separation of a part in the vicinity of the or each connection portion of the conductive wire 300 from the embedded portion 510 of the corresponding terminal 500. Furthermore, since the at least one terminal 500 is externally connectable, it is easier to externally connect the three-dimensional structure S1, as compared with the case where the external connection is made through the at least one connection portion of the conductive wire 300. Where the three-dimensional structure S3 includes the connector, it is further easier to connect the three-dimensional structure S3 to an external device, by connecting the body 600 of the three-dimensional structure S3 to a mating connector of the external device.

The three-dimensional structure and the method for manufacturing the same of the invention are not limited to the embodiments described above, but may be modified as appropriate within the scope of the claims. Some examples of modification are described below.

The three-dimensional structure may be disposed forwardly of a millimeter wave radar device in a transmission direction (e.g., Z direction) of millimeter waves. In this case, the first structure 100 and the plastic layer 200 of the three-dimensional structure described above may be made of a material that exhibits low attenuation of millimeter waves transmitting through the first structure 100 and the plastic layer 200. The millimeter waves are those irradiated from a millimeter wave radar device and those subsequently reflected by an irradiation target. Where the above-described three-dimensional structure includes the second structure 400, the second structure 400 may also be made of a material that exhibit low attenuation of the millimeter waves transmitted therethrough. The conductive wires 300 of the three-dimensional structure described above may be, but not limited to, arranged at such spaced intervals that hardly interrupts the millimeter waves transmitted therebetween.

The or each connection portion of the conductive wire 300 of any of the above aspects is connectable to any portion of the corresponding terminal 500. For example, the or each connection portion of the conductive wire 300 of any of the above aspects may be in contact with, and electrically connected to, a portion other than the embedded portion 510 of the corresponding terminal 500.

Where neither the second structure 400 nor the infill layer I are provided, the body 600 may be fixed, or integrally provided, on the second face 202 of the plastic layer 200. In this case, the external connection portion 520 of the single terminal 500, or alternatively the external connection portions 520 of the plurality of terminals 500, are disposed in the through hole 610 of the body 600.

REFERENCE SIGNS LIST 10, 10': First molding die
10a, 10a': First mold
10b: Second mold
11: Cavity
12: Sprue
13: Accommodation hole
20, 20': Second molding die
20a, 20a': First mold
20b: Second mold
21: Cavity
22: Projection
23: Accommodation hole
S1, S2, S3: Three-dimensional structure
100: First structure; 101: fixing face; 110: main body; 120: functional layer
200: Plastic layer; 201: first face; 202: second face
300: Conductive wire; 310: wire body; 320: fusion layer; 330: insulating layer
400: Second structure
500: Terminal; 510: embedded portion; 520: external connection portion
U: Ultrasonic head

What is claimed is:

1. A method for manufacturing a three-dimensional structure comprising:
preparing a first structure including a fixing face;
fixing a plastic layer to the fixing face of the first structure;
preparing a conductive wire; and
operating an ultrasonic head to apply ultrasonic waves to the conductive wire and to press the conductive wire against the plastic layer, and thereby partly embedding the conductive wire into the plastic layer, wherein
the fixing of the plastic layer includes
placing the first structure into a cavity of a first molding die,
injecting molten plastic onto the fixing face of the first structure in the cavity of the first molding die, and
solidifying the molten plastic to mold the plastic layer on the fixing face of the first structure,
the molding of the plastic layer includes
placing at least a part of an embedded portion of a terminal into the cavity of the first molding die and inserting an external connection portion of the terminal into an accommodation hole communicating with the cavity of the first molding die,
inserting at least the part of the embedded portion of the terminal into the molten plastic injected into the cavity of the first molding die, and
solidifying the molten plastic to insert-mold at least the part of the embedded portion of the terminal into the plastic layer,
the method further includes electrically connecting the terminal to the conductive wire,
the plastic layer includes a first face in contact with the fixing face of the first structure and a second face opposite to the first face,
a binder layer is provided on the embedded portion of the terminal,
the insert-molding of the embedded portion of the terminal includes insert-molding the embedded portion of the terminal into the plastic layer such that an exposed face of the binder layer is substantially flush with the second face of the plastic layer,
the embedding of the conductive wire includes
operating the ultrasonic head to apply ultrasonic waves onto the conductive wire and to press the conductive wire against the second face of the plastic layer, and thereby partly embedding the conductive wire into the second face of the plastic layer, and
operating the ultrasonic head to apply ultrasonic waves onto the conductive wire and bringing the conductive wire partly into contact with the exposed face of the binder layer, and the electrical connecting of the terminal to the conductive wire includes melting the binder layer and partly exposing the embedded portion of the terminal from the binder layer to connect the conductive wire to the embedded portion of the terminal by heat swaging, welding, or soldering.

2. The method according to claim 1, wherein
the conductive wire includes a wire body and a fusion layer covering the wire body, and
the electrical connection of the terminal to the conductive wire includes partly melting the fusion layer and partly exposing the wire body from the fusion layer to connect the conductive wire to the embedded portion of the terminal by heat swaging, welding, or soldering.

3. The method according to claim 2, wherein
the conductive wire further includes an insulating layer between the wire body and the fusion layer, and
the electrical connection of the terminal to the conductive wire includes partly melting the insulating layer and the fusion layer and partly exposing the wire body from the insulating layer and the fusion layer to connect the conductive wire to the embedded portion of the terminal by heat swaging, welding, or soldering.

4. The method according to claim 1, wherein
the fixing face of the first structure is provided with at least one protrusion and at least one recess,
the plastic layer includes a first face in contact with the fixing face of the first structure and a second face opposite to the first face,
the second face of the plastic layer is a flat face, a convex curved face, or a concave curved face, and
the embedding of the conductive wire includes operating the ultrasonic head to apply ultrasonic waves onto the conductive wire and to press the conductive wire against the second face of the plastic layer, and thereby partly embedding the conductive wire into the second face of the plastic layer.

5. The method according to claim 1, further comprising:
fixing a second structure to the plastic layer after embedding the conductive wire and covering with the second structure the conductive wire partly protruding from the plastic layer.

6. The method according to claim 5, further comprising:
placing the first structure, the plastic layer, the conductive wire, and the second structure into a cavity of a second molding die;
injecting molten plastic between the plastic layer and the second structure in the cavity of the second molding die;
inserting a portion of the conductive wire that protrudes from the plastic layer into the molten plastic injected into the cavity of the second molding die;
solidifying the molten plastic in the cavity of the second molding die to mold an infill layer between the plastic layer and the second structure; and
embedding the portion of the conductive wire protruding from the plastic layer in the infill layer.

* * * * *